(12) United States Patent
Torabi et al.

(10) Patent No.: US 11,787,149 B2
(45) Date of Patent: Oct. 17, 2023

(54) COMBINED SHEETS AND METHOD AND SYSTEM FOR PRODUCING SAME

(71) Applicant: 10856479 Canada Inc., Niagara Falls (CA)

(72) Inventors: Ali Torabi, Niagara-on-the-Lake (CA); Faraz Torabi, Niagara-on-the-Lake (CA)

(73) Assignee: 10856479 Canada Inc., Niagara-on-the-Lake (CA)

( * ) Notice: Subject to any disclaimer, the term of this patent is extended or adjusted under 35 U.S.C. 154(b) by 433 days.

(21) Appl. No.: 17/045,525

(22) PCT Filed: Jul. 19, 2019

(86) PCT No.: PCT/CA2019/050994
§ 371 (c)(1),
(2) Date: Oct. 6, 2020

(87) PCT Pub. No.: WO2020/014788
PCT Pub. Date: Jan. 23, 2020

(65) Prior Publication Data
US 2021/0162699 A1    Jun. 3, 2021

Related U.S. Application Data

(60) Provisional application No. 62/700,984, filed on Jul. 20, 2018.

(51) Int. Cl.
*B32B 3/28* (2006.01)
*B32B 3/26* (2006.01)
(Continued)

(52) U.S. Cl.
CPC ............... *B32B 3/28* (2013.01); *B21D 39/02* (2013.01); *B21D 39/031* (2013.01);
(Continued)

(58) Field of Classification Search
CPC .. B32B 3/28; B32B 3/06; B32B 3/266; B32B 3/30; B32B 7/08; B32B 15/01;
(Continued)

(56) References Cited

U.S. PATENT DOCUMENTS 6,139,974 A * 10/2000 Atkinson ................ F28F 13/00
72/379.6
6,231,944 B1    5/2001 Holt
(Continued)

FOREIGN PATENT DOCUMENTS

CA    1315917 C    4/1993
CA    2108929 A1   6/1994
(Continued)

OTHER PUBLICATIONS

International Searching Authority, PCT International Search Report and Written Opinion of the International Searching Authority relating to application No. PCT/CA2019/050994, dated Sep. 20, 2019.
(Continued)

*Primary Examiner* — Jasper Saberi
(74) *Attorney, Agent, or Firm* — Rowand LLP

(57) ABSTRACT

Combined sheets and a method of producing combined sheets. A combined sheet includes a main sheet including a first main indentation feature providing a first overhang over a first portion of the main sheet and a second main indentation feature providing a second overhang over a second portion of the main sheet. The combined sheet also includes a foundation sheet abutting the main sheet. The foundation sheet includes a first foundation indentation feature crimped to the first main indentation feature and a second foundation indentation feature crimped to the second main indentation feature. The first overhang and the second overhang provides overhangs in different directions to prohibit separation of the foundation sheet from the main sheet. The method of
(Continued)

producing the combined sheet includes co-locating the main sheet to abut the foundation sheet and pressing one or more indentation punches for forming indentation features providing overhangs in different directions.

11 Claims, 21 Drawing Sheets

(51) Int. Cl.

| | | |
|---|---|---|
| B32B 5/18 | (2006.01) | |
| B32B 15/082 | (2006.01) | |
| B32B 15/092 | (2006.01) | |
| B32B 15/12 | (2006.01) | |
| B32B 15/14 | (2006.01) | |
| B32B 38/04 | (2006.01) | |
| B32B 38/06 | (2006.01) | |
| F16B 5/04 | (2006.01) | |
| B21D 39/02 | (2006.01) | |
| B21D 39/03 | (2006.01) | |
| B32B 15/01 | (2006.01) | |
| B32B 15/04 | (2006.01) | |
| B32B 3/30 | (2006.01) | |
| B32B 3/06 | (2006.01) | |
| B32B 7/08 | (2019.01) | |
| F16B 17/00 | (2006.01) | |
| B32B 37/00 | (2006.01) | |

(52) U.S. Cl.
CPC ............. *B21D 39/032* (2013.01); *B32B 3/06* (2013.01); *B32B 3/266* (2013.01); *B32B 3/30* (2013.01); *B32B 5/18* (2013.01); *B32B 7/08* (2013.01); *B32B 15/01* (2013.01); *B32B 15/011* (2013.01); *B32B 15/043* (2013.01); *B32B 15/082* (2013.01); *B32B 15/092* (2013.01); *B32B 15/12* (2013.01); *B32B 15/14* (2013.01); *B32B 38/04* (2013.01); *B32B 38/06* (2013.01); *F16B 5/045* (2013.01); *F16B 17/008* (2013.01); *B32B 2037/0092* (2013.01); *B32B 2250/02* (2013.01); *B32B 2266/0228* (2013.01); *B32B 2307/304* (2013.01)

(58) Field of Classification Search
CPC ..... B32B 15/011; B32B 15/043; B32B 38/04; B32B 2037/0092; B32B 2307/304; B32B 2038/042; B21D 39/031; F16B 5/045
See application file for complete search history.

(56) References Cited

U.S. PATENT DOCUMENTS

| | | | |
|---|---|---|---|
| 2006/0103171 A1* | 5/2006 | Blomeling | B60R 13/0876 |
| | | | 296/204 |
| 2007/0231062 A1* | 10/2007 | Durney | F16B 5/045 |
| | | | 403/275 |
| 2014/0238648 A1* | 8/2014 | Lehr | B32B 15/02 |
| | | | 165/135 |
| 2019/0178271 A1* | 6/2019 | Takashi | B21D 39/031 |
| 2021/0040968 A1* | 2/2021 | Kulick, III | F16B 5/0096 |

FOREIGN PATENT DOCUMENTS

| | | |
|---|---|---|
| CA | 2757375 A1 | 4/2013 |
| DE | 19918516 C2 | 5/2003 |
| DE | 4427472 C2 | 10/2003 |
| FR | 2764235 B1 | 10/2006 |

OTHER PUBLICATIONS

EPO, Extended European Search Report relating to EP application No. 19838575.9 dated Feb. 2, 2022.

* cited by examiner

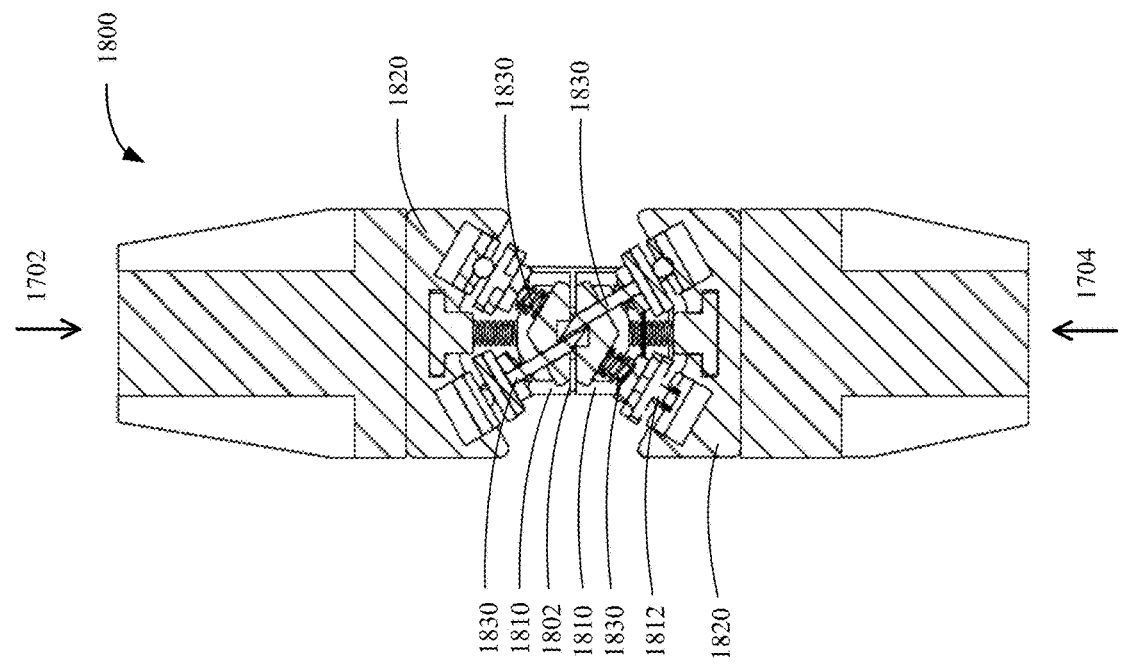
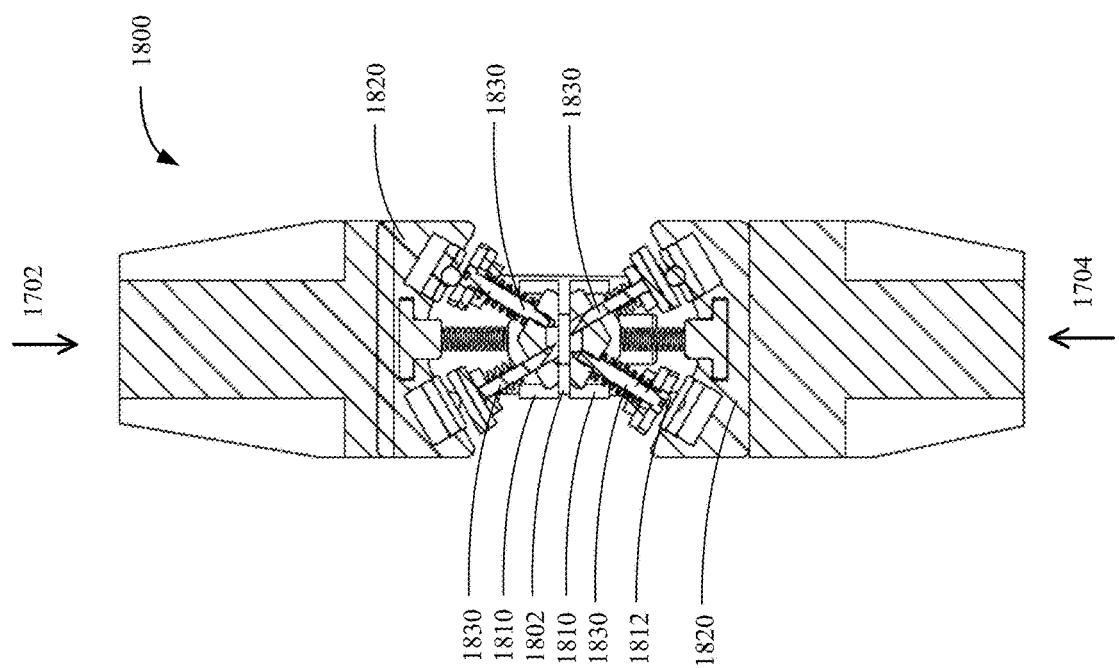

COMBINED SHEETS AND METHOD AND SYSTEM FOR PRODUCING SAME

FIELD

The present application generally relates to sheet materials and, in particular, to combined sheets having two or more joined materials.

BACKGROUND

Sheet materials are common raw materials for producing products. Sheet metals, for example, may be cut, manipulated, or combined with other materials. Various processes for joining sheet materials include operations for applying adhesives between sheet materials or operations for pressing sheet materials against another. Over time, joined sheet materials may separate. For example, adhesives may deteriorate and lose its tack for keeping the sheet materials joined. In another example, respective sheet materials may be subjected to cyclic environmental conditions and may cause joining forces from mechanical press operations to wean.

BRIEF DESCRIPTION OF THE DRAWINGS

Reference will now be made, by way of example, to the accompanying drawings which show example embodiments of the present application, and in which:

FIGS. 18A and 18B illustrate elevation, cross-sectional views of a press apparatus at varying operational stages for forming indentation features, in accordance with an example of the present application.

Similar reference numerals may have been used in different figures to denote similar components.

DESCRIPTION OF EXAMPLE EMBODIMENTS

Figure 1A:
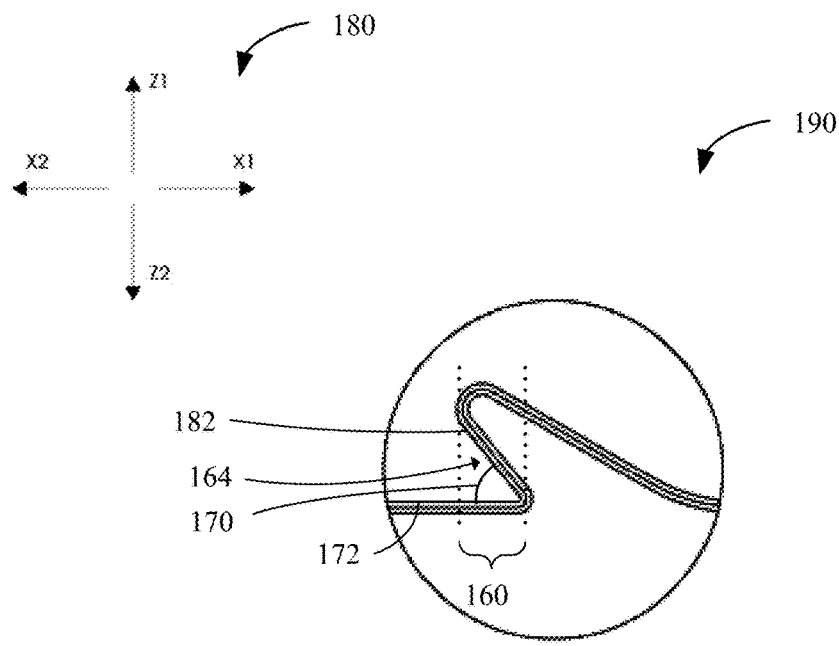
FIG. 1A illustrates a cross-sectional view of a first indentation feature, in accordance with an example of the present application.

Various examples and aspects of the present application will be described with reference to the details discussed herein. The following description and drawings are illustrative of the present application and are not to be construed as limiting the present application. Numerous details are described to provide a thorough understanding of various embodiments. However, in certain instances, well-known or conventional details are not described in order to provide a concise discussion of the embodiments of the present application.

In one aspect, the present application describes a combined sheet. The combined sheet includes: a main sheet including a first main indentation feature providing a first overhang over a first portion of the main sheet and a second main indentation feature providing a second overhang over a second portion of the main sheet; and a foundation sheet abutting the main sheet, the foundation sheet including a first foundation indentation feature and a second foundation indentation feature, the first foundation indentation feature being crimped to the first main indentation feature and the second foundation indentation feature being crimped to the second main indentation feature, wherein the first overhang and the second overhang provide overhangs in different directions to prohibit separation of the foundation sheet from the main sheet.

In another aspect, the present application describes a method of producing a combined sheet. The combined sheet includes a main sheet and a foundation sheet. The method includes: co-locating the main sheet to abut the foundation sheet such that the main sheet is substantially parallel to the foundation sheet; pressing one or more indentation punches to be incident on a sheet combination including the main sheet and the foundation sheet for forming two or more indentation features. The two or more indentation features may include a first indentation feature including a first main indentation feature providing a first overhang over a first portion of the main sheet, the first indentation feature including a first foundation indentation feature crimped to the first main indentation feature; and a second indentation feature including a second main indentation feature providing a second overhang over a second portion of the main sheet, the second indentation feature including a second foundation indentation feature crimped to the second main indentation feature, wherein the first overhang and the second overhang provide overhangs in different directions to prohibit separation of the foundation sheet from the main sheet.

Other aspects and features of the present application will be understood by those of ordinary skill in the art from review of the following description of examples in conjunction with the accompanying figures.

In the present application, the terms "comprises" and "comprising" are intended to be inclusive and open ended, and not exclusive. Specifically, when used in the specification and claims, the terms "comprises" and "comprising" and variations thereof mean the specified features, steps, or components are included. These terms are not to be interpreted to exclude the presence of other features, steps, or components.

In the present application, the term "exemplary" means "serving as an example, instance, or illustration", and should not be construed as preferred or advantageous over other configurations disclosed herein.

In the present application, the terms "about", "approximately", and "substantially" are meant to cover variations that may exist in the upper and lower limits of the ranges of values, such as variations in properties, parameters, and dimensions. In a non-limiting example, the terms "about", "approximately", and "substantially" may mean plus or minus 10 percent or less.

In the present application, the term "and/or" is intended to cover all possible combinations and sub-combinations of the listed elements, including any one of the listed elements alone, any sub-combination, or all of the elements, and without necessarily excluding additional elements.

In the present application, the phrase "at least one of . . . or . . . " is intended to cover any one or more of the listed elements, including any one of the listed elements alone, any sub-combination, or all of the elements, without necessarily excluding any additional elements, and without necessarily requiring all of the elements.

Examples described herein relate to combined sheets produced from a combination of two or more individual sheet materials. Examples of methods and systems for producing the combined sheets are also described herein. A first sheet metal and a second sheet metal, for example, may be combined via joints. Mechanical processes such as embossing may be used to form joints for joining said materials. In one example, the first sheet metal may be placed adjacent to or abutting the second sheet metal and may be subjected to embossing or stretching by a press. Embossing may be a form of precision stamping in which the sheet metals are subjected to high stress for inducing plastic flow. When a plurality of joints are embossed across the surface of abutting sheet metals, the sheet metals may be joined to form a combined sheet. When a plurality of joints are provided across the surface of the composite sheet, the plurality of joints may collectively hold one of the sheet material to the other sheet material.

In some examples, respective joints may be indentation features and may generally be oriented in a similar direction. For example, the embossing or stretching process may, via a punch, subject a non-penetrating force to the first sheet that is adjacent the second sheet for producing one or more indentation features. The indentation features may extend in a direction from the first sheet metal to the second sheet metal, or vice versa. Each indentation feature may be generally oriented in a direction that is normal or perpendicular to the planar surface of the respective sheets. In some other examples, each respective indentation feature may be generally oriented in a similar direction and may be oriented in a direction that may not be perpendicular to the planar surface of the respective sheets.

Over time, however, the respective joints can deform, thereby reducing the force that may hold the sheet metals to another. Deformed joints may cause respective sheet metals to separate from one another, causing finished products to unravel or become disassembled. Because the one or more joints may generally be oriented in a similar direction, a respective sheet metal can separate from the other sheet metal by sliding in a direction opposite to the direction of the respective joints.

The present application provides a combined sheet and methods and systems for producing said combined sheet for ameliorating some of the aforementioned disadvantages.

Reference is made to FIG. 1A, which illustrates a cross-sectional view of a first indentation feature 190, in accordance with an example of the present application. The illustrated first indentation feature 190 is an enlarged view of an indentation feature located on a combined sheet. Features of the first indentation feature 190 will be described with reference to FIG. 1A, while features of said combined sheet will be described elsewhere herein.

Features of indentation features may be described with reference to a Cartesian coordinate space, where direction may be referenced according to an illustrated compass rose 180. For example, positive and negative z-directions may be represented by arrows labelled Z1 and Z2, respectively. Positive and negative x-directions may be represented by arrows labelled X1 and X2, respectively. Although the example illustrated in FIG. 1A includes a compass rose 180 that is based on the Cartesian coordinate space, any other coordinate space for describing or referencing direction may be contemplated.

The first indentation feature 190 may be a joint produced via a punch during an embossing or stretching process. When a main sheet is placed adjacent to or abutting a foundation sheet 120, the first indentation feature 190 may be produced when a punch provides a non-penetrating force to the foundation sheet and the main sheet for producing the first indentation feature 190. For ease of exposition, the first indentation feature 190 may be generally oriented in a direction including a combination of the negative x-direction and the positive z-direction. Although the first indentation feature 190 is illustrated as being generally oriented in a direction including a combination of the negative x-direction and the positive z-direction, in some other examples, the indentation feature may be generally oriented in a direction that is normal to the planar surface of the main sheet or the foundation sheet, or may be generally oriented in any other direction.

In FIG. 1A, the first indentation feature 190 includes a first foundation indentation feature crimped to a first main indentation feature. The first main indentation feature and the first foundation indentation feature may have related shape and related size. For example, the first foundation indentation feature may have a substantially similar shape to the first main indentation feature, but may be appreciably smaller in size as compared to the first main indentation feature such that the first foundation indentation feature may fit within the first main indentation feature. The first main indentation feature and the first foundation indentation feature will be illustrated and described in greater detail herein.

The first indentation feature 190 may provide a first overhang 164 over a first portion 160 of a main sheet 172. In FIG. 1A, a partial view of the main sheet 172 that is proximal to the first indentation feature 190 is illustrated. The first overhang 164 may be associated with a first direction defined by a first angle 170 between: (a) the first portion 160 of the main sheet 172; and (b) an indentation surface 182 of the first overhang 164 that hovers over the first portion 160 of the main sheet 172. In the example illustrated in FIG. 1A, the first overhang 164 may extend in a first direction including a combination of the negative x-direction and the positive z-direction.

In some examples, the first angle 170 may be an acute angle, such as an angle less than 90 degrees. In some examples, the first angle 170 may be less than 10 degrees. In some examples, the first angle 170 may be near 0 degrees such that the first overhang 164 abuts the first portion 160 of the main sheet 172. The first angle 170 may, in combination with other features or characteristics, define the first indentation direction for the first indentation feature 190.

The first indentation feature 190 may be a joint for joining the foundation sheet to the main sheet. When a punch imparts a non-penetrating force to the main sheet and the foundation sheet for producing the first indentation feature 190, high stress imparted by the punch may induce plastic flow and cause the foundation sheet to be joined to the main sheet. However, over time, the joint at the first indentation feature 190 can deform. In the case where the foundation sheet may be joined to the main sheet using a single joint or indentation feature, when the joint deforms, the foundation sheet may separate from the main sheet by sliding in a direction that is opposite to the first direction described above. That is, when the joint deforms, the foundation sheet 120 may separate from the main sheet 172 in a direction including a combination of the negative z-direction and the positive x-direction (in contrast to the first direction that includes a combination of a positive z-direction and the negative x-direction).

In another case where the foundation sheet may be joined to the main sheet using two or more joints or indentation features each generally oriented in a similar direction (e.g., the first direction), when the respective joints deform, the foundation sheet may separate from the main sheet by sliding in a direction that may be opposite to the common direction of the respective joints (e.g., a direction that may be opposite to the first direction). Accordingly, it may be desirable to provide a combined sheet for ameliorating some of the aforementioned disadvantages.

Figure 1B:
FIG. 1B illustrates a cross-sectional view of a combined sheet, in accordance with an example of the present application.

Reference is now made to FIG. 1B, which illustrates a cross-sectional view of a combined sheet 100, in accordance with an example of the present application. The combined plate 100 may include a main sheet and a foundation sheet. Further features of the combined sheet 100 may be apparent with reference to a subsequent exploded view of the combined sheet 100.

The combined sheet illustrated in FIG. 1B includes the first indentation feature 190 (FIG. 1A) and a second indentation feature 195. The first indentation feature 190 may be substantially the same size and shape as the second indentation feature 195, but the first indentation feature 190 may be oriented in a direction that may be different than a direction of the second indentation feature 195.

For example, the first indentation feature 190 may provide a first overhang over a first portion of the main sheet. The second indentation feature 195 may provide a second overhang over a second portion of the main sheet. As was described with respect to FIG. 1A, the first overhang 164 may be associated with the first direction defined by a first angle between: (a) the first portion 160 of the main sheet 172; and (b) an indentation surface 182 of the first overhang 164 that hovers over the first portion of the main sheet 172. Further, the second overhang may include features similar to the first overhang 164, but may be provided in a different direction. For example, the second overhang may be associated with the second direction defined by a second angle between: (a) the second portion of the main sheet; and (b) an indentation surface of the second overhang that hovers over the second portion of the main sheet. The first overhang and the second overhang provide overhangs in different directions to prohibit separation of the foundation sheet from the main sheet.

In the example illustrated in FIG. 1B, the first indentation feature 190 may be associated with a first direction that is different than a second direction of the second indentation feature 195. The first direction may be generally oriented in a direction that includes a combination of the negative x-direction and the positive z-direction, while the second direction may be generally oriented in a direction that includes a combination of the positive x-direction and in the positive z-direction. Over time, even when the respective joints at the first indentation feature 190 and the second indentation feature 195 deform or wean (e.g., joining forces from mechanical press operations weaken), the foundation sheet 120 may not easily separate by sliding away from the main sheet 110, at least, because the indentation features are oriented in different directions. Because the first indentation feature 190 and the second indentation feature 195 may be features formed from sheet metal material having some rigid properties, separating the main sheet from the foundation sheet may require that the general shape of the respective indentation features be deformed.

In some examples, the first direction may be substantially orthogonal to the second direction. That is, the first direction may be spatially oriented in a direction that may be 90 degrees or perpendicular to the spatial orientation of the second direction.

Based on the described examples, the foundation sheet 120 may be joined to the main sheet 110 based at least on: (1) joints at the respective indentation features; (2) binding forces due in part to the spatial orientation of the first indentation feature 190 relative to the second indentation feature 195; and/or (3) cold welding among sheets of material from one of the example methods described herein.

Figure 1C:
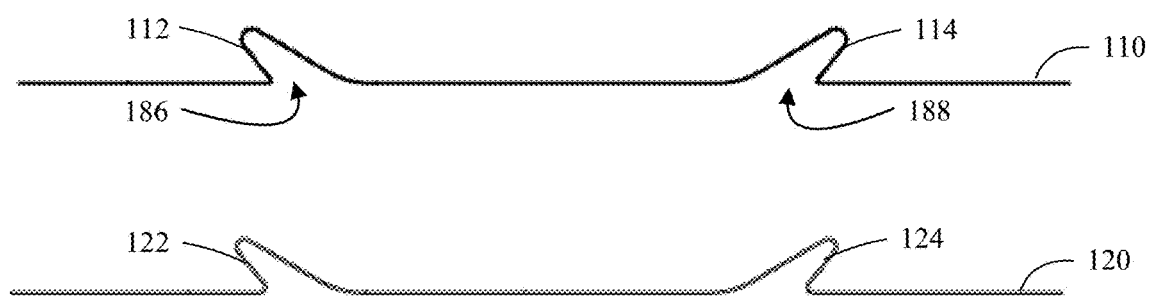
FIG. 1C illustrates an exploded, cross-sectional view of the combined sheet of FIG. 1B.

To further illustrate features of the combined sheet 100, reference is now made to FIG. 1C, which illustrates an exploded, cross-sectional view of the combined sheet 100 (FIG. 1B).

The combined sheet 100 may include a main sheet 110 and a foundation sheet 120. The main sheet 110 may include a first main indentation feature 112. The first main indentation feature 112 may provide a first overhang over a first portion of the main sheet 110. The first overhang may be correspond to the first overhang 164 illustrated in FIG. 1A and may be associated with a first direction. The main sheet 110 may also include a second main indentation feature 114 providing a second overhang over a second portion of the main sheet. The second overhang may include similar features as the first overhang, while the second overhang may be associated with a second direction that is different than the first direction.

The first main indentation feature 112 and the second main indentation feature 114 may protrude from a common side of the main sheet to form a first overhang cavity 186 and a second overhang cavity 188, respectively.

The foundation sheet 120 may be adjacent to or may abut the main sheet 110. The foundation sheet 120 may include a first foundation indentation feature 122 and a second foundation indentation feature 124. In some examples, the first foundation indentation feature 122 may be crimped to the first main indentation feature 112 and the second foundation indentation feature 124 may be crimped to the second main indentation feature 114 for joining the foundation sheet 120 to the main sheet 110. That is, the first foundation indentation feature 122 may be crimped within the first main indentation feature 112. The second foundation indentation feature 124 may be crimped within the second main indentation feature 114.

Generally, the first indentation feature 190 (FIG. 1B) includes the first foundation indentation feature 122 crimped to the first main indentation feature 112. The second indentation feature 195 (FIG. 1B) includes the second foundation indentation feature 124 crimped to the second main indentation feature 114.

In some examples, as illustrated in FIG. 1C, the first foundation indentation feature 122 that is crimped to the first main indentation feature 112 may have related shape and related size. For example, the first foundation indentation feature 122 may have a substantially similar shape to the first main indentation feature 112, but may be appreciably smaller in size as compared to the first main indentation feature 112 such that the first foundation indentation feature 122 may fit within the first main indentation feature 112. Similarly, the second foundation indentation feature 124 that is crimped to the second main indentation feature 114 may have related shape and related size. For example, the second foundation indentation feature 124 may have a substantially similar shape to the second main indentation feature 114, but may be appreciably smaller in size as compared to the second main indentation feature 114 such that the second foundation indentation feature 124 may fit within the second main indentation feature 114. In the foregoing examples, the first foundation indentation feature 122 may extend within the first overhang 164 of the first main indentation feature. Similarly, the second foundation indentation feature 124 may extend within the second overhang of the second main indentation feature.

Figure 2:
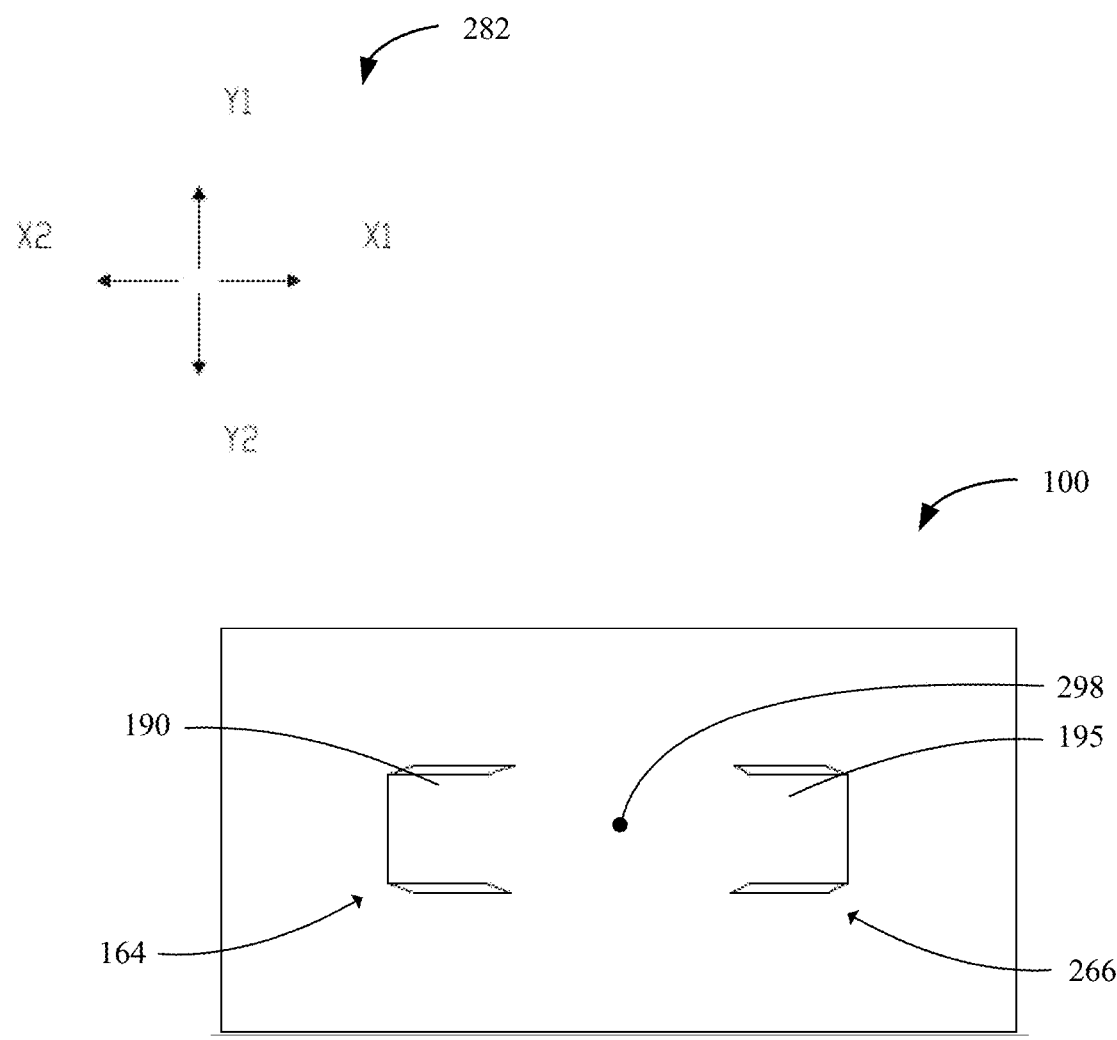
FIG. 2 illustrates a top view of the combined sheet of FIG. 1B.

Reference is now made to FIG. 2, which illustrates a top view of the combined sheet 100 of FIG. 1B, in accordance with an example of the present application. Features of the combined sheet 100 in FIG. 2 may be referenced according to a second compass rose 282. For example, positive and negative y-directions may be represented by arrows labelled Y1 and Y2, respectively. Positive and negative x-directions may be represented by arrows labelled X1 and X2, respectively. Although the example illustrated in FIG. 2 includes the second compass rose 282 that is based on the Cartesian coordinate system, any other coordinate space for describing or referencing direction may be contemplated.

FIG. 2 generally illustrates a top view of the first indentation feature 190 and the second indentation feature 195. Further, the first indentation feature 190 includes the first overhang 164 and the second indentation feature 195 includes a second overhang 266. The combined sheet 100 illustrated in FIG. 2 includes two indentation features. In some other examples, the combined sheet 100 may include any number of indentation features, where each indentation feature may have a respective indentation direction that is different than an indentation direction of another indentation feature.

In some examples, the combined sheet 100 may include an indentation rotation point 298. The indentation rotation point 298 is a reference point. The indentation rotation point 298 may be equidistant to at least one respective feature of the first indentation feature 190 and the second indentation feature 195. For example, the indentation rotation point 298 may be equidistant to a centroid of the first portion 160 of the main sheet (see e.g., FIG. 1A) and a centroid of the second portion of the main sheet. Although a centroid of a portion of the main sheet (e.g., portion on which an overhang hovers over) is used as another reference point for describing the indentation rotation point 298, other reference points that can be ascertained for each of the indentation features may be contemplated for identifying an indentation rotation point 298.

The indentation rotation point 298 is a reference point about which the combined sheet 100 may have rotational symmetry. An object or shape may have rotational symmetry when that object or that shape appears to be the same object or shape when rotated by some angle that is less than 360 degrees. For example, in FIG. 2, the combined sheet 100 may have rotational symmetry of order 2. Order of rotational symmetry refers to the number of times that the combined sheet 100 matches when the combined sheet 100 is rotated 360 degrees about the indentation rotation point 298. The combined sheet 100 illustrated in FIG. 2 includes the first indentation feature 190 and the second indentation feature 195 and has rotational symmetry of order two. That is, in FIG. 2, the first indentation feature 190 and the second indentation feature 195 may be oriented on the main sheet to have rotational symmetry about the indentation rotation point 298. When the combined sheet 100 has a rotational symmetry of order two, the first indentation feature 190 may appear as a mirror image of the second indentation feature 195 with respect to a plane that intersects the indentation rotation point 298. In some examples, the combined sheet 100 may have any number of indentation features and the indentation features may be arranged and oriented to include rotational symmetry of order greater than two.

Figure 3A:
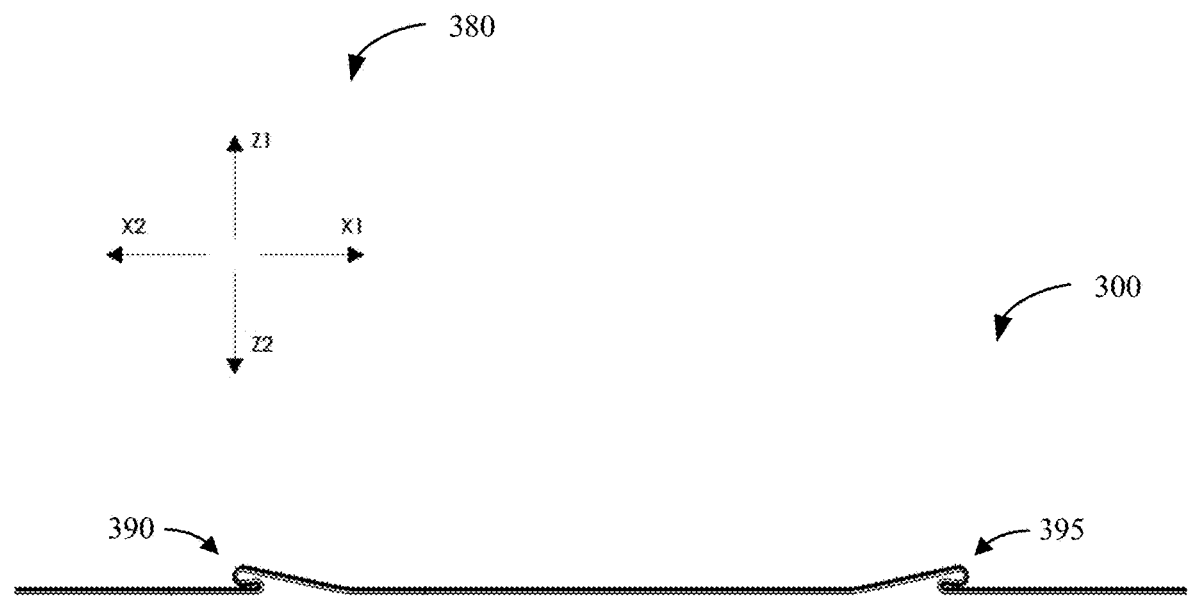
FIG. 3A illustrates a cross-sectional view of a combined sheet, in accordance with another example of the present application.

Reference is now made to FIG. 3A, which illustrates a cross-sectional view of a combined sheet 300, in accordance with another example of the present application. Features may be described with reference to a third compass rose 380. The third compass rose 380 may be similar to the compass rose 180 of FIGS. 1A to 1C. That is, positive and negative z-directions may be represented by arrows labelled Z1 and Z2, respectively. Positive and negative x-directions may be represented by arrows labelled X1 and X2, respectively.

The combined sheet 300 includes features that may be similar to the combined sheet 100 of FIG. 1B. For example, the combined sheet 300 may include a main sheet and a foundation sheet (not explicitly identified in FIG. 3A). Further, the combined sheet 300 of FIG. 3 may include a first indentation feature 390 and a second indentation feature 395. The first indentation feature 390 may provide a first overhang over a first portion of the main sheet, where the first overhang is oriented in a first direction. The second indentation feature 395 may provide a second overhang over a second portion of the main sheet, where the second overhang is oriented in a second direction. The first direction and the second direction may be different. Similar to the combined sheet 100 of FIG. 1B, the first indentation feature 390 may include a first foundation indentation feature (not explicitly identified in FIG. 3A) crimped to the first main indentation feature (not explicitly identified in FIG. 3A) and the second indentation feature 295 may include a second foundation indentation feature (not explicitly identified in FIG. 3A) crimped to the second main indentation feature (not explicitly identified in FIG. 3A).

Figure 3B:
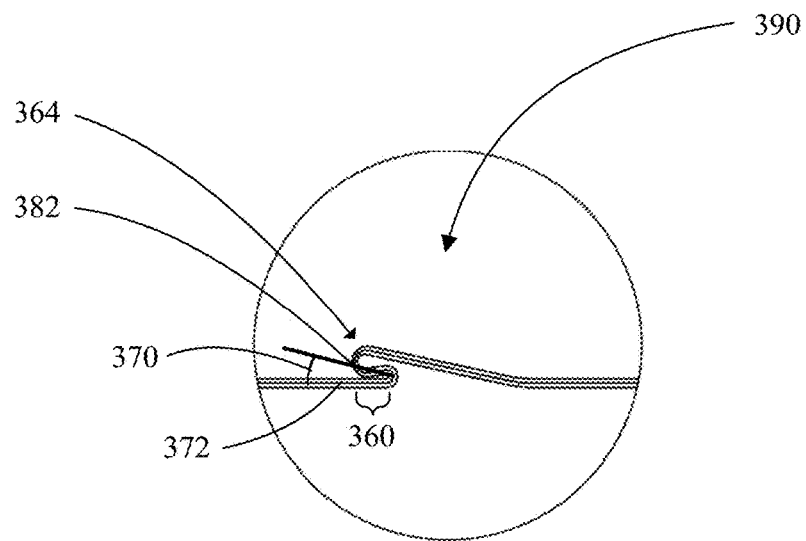
FIG. 3B illustrates a first indentation feature of the combined sheet of FIG. 3A.

Reference is now made to FIG. 3B, which illustrates an enlarged, cross-sectional view of the first indentation feature 390 of FIG. 3A. FIG. 3B features an enlarged view of the first indentation feature 390 located on the combined sheet 300.

The first indentation feature 390 may be a joint produced via a punch during an embossing or stretching process. That is, when the main sheet is placed adjacent to or abutting the foundation sheet, the first indentation feature 390 may be produced when a punch provides a non-penetrating force to the foundation sheet 120 and the main sheet 110. The first indentation feature 390 may be generally oriented in a direction including a combination of the negative x-direction and the positive z-direction, similar to the first indentation feature 190 illustrated in FIG. 1. However, the first indentation feature 390 may have a different indentation angle.

The first indentation feature 390 may provide a first overhang 364 over a first portion 360 of the main sheet 372. In FIG. 3B, a partial view of the main sheet 372 that is proximal to the first indentation feature 390 is illustrated. The first overhang 364 may be associated with a first direction defined by a first angle 370 between: (a) the first portion 360 of the main sheet 372; and (b) an indentation surface 382 of the first overhang 364 that hovers over the first portion 360 of the main sheet 372. For ease of exposition, the indentation surface 382 is highlighted using a line in FIG. 3B. In the example illustrated in FIG. 3B, the first overhang 364 may extend in a first direction including a combination of the negative x-direction and the positive z-direction. It will be appreciated that in some examples, the first indentation feature 390 illustrated in FIG. 3B is a result of a multi-step process where: (1) the first overhang 364 may be produced to extend in a direction perpendicular to the main sheet 372; and, subsequently, (2) the first overhang 364 may be shaped to extend in another direction, such as the direction illustrated in FIG. 3B. Example steps of the multi-step process will be described herein.

In some examples, the first angle 370 may be an acute angle, such as an angle less than 90 degrees. In some examples, the first angle 370 may be less than 10 degrees. In some examples, the first angle 370 may be near 0 degrees. That is, a punch may be oriented to impart a non-penetrating force to the surface of the foundation sheet for producing the first indentation feature 390 having features illustrated in FIG. 3B. In some other examples, the first indentation feature 390 illustrated in FIG. 3B may be a result of a multi-step process. As will be illustrated in other examples described herein, the embossing or stretching process may produce an indentation feature having a direction that is normal to a planar surface of the combined sheet 300, and the produced indentation feature may subsequently be rolled or pressed such that the first angle 370 may be less than 10 degrees.

Figure 4:
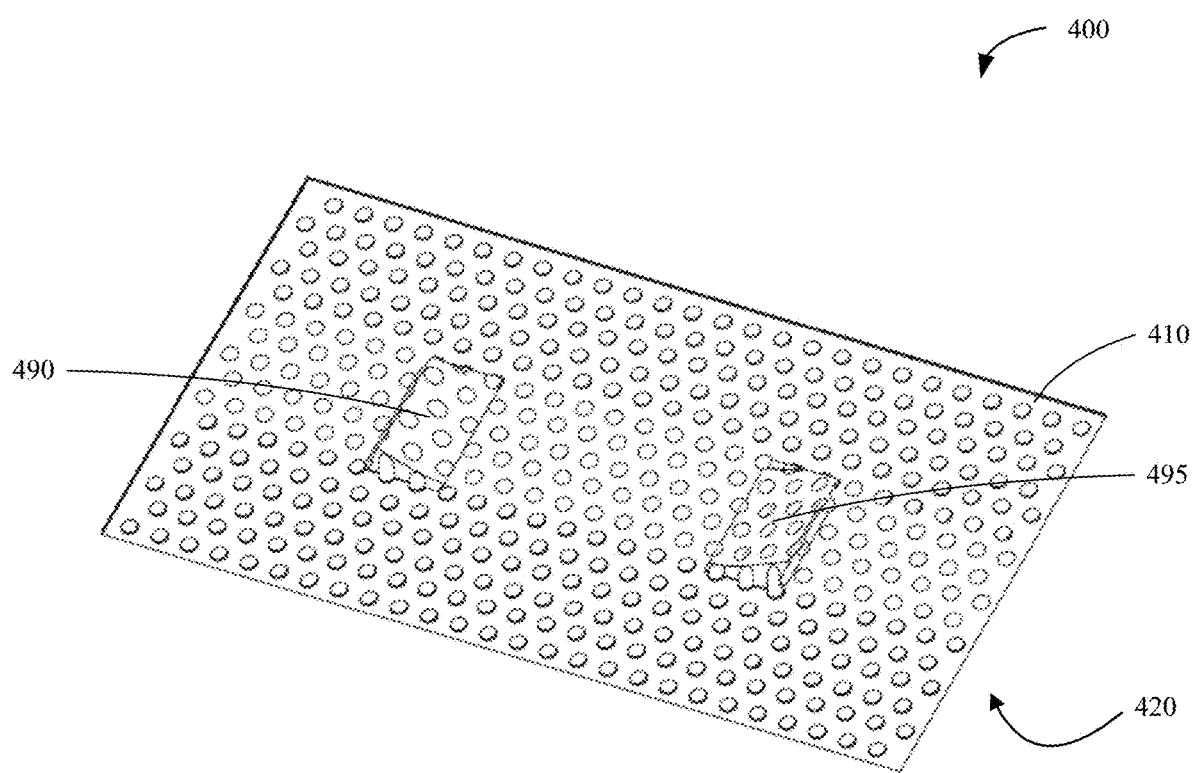
FIG. 4 illustrates a perspective view of a combined sheet, in accordance with another example of the present application.

Reference is now made to FIG. 4, which illustrates a perspective view of a combined sheet 400, in accordance with another example of the present application. The combined sheet 400 may be similar to the combined sheet 100 of FIGS. 1A to 1C and 2; however, the combined sheet 400 of FIG. 4 may include a main sheet 410 and a foundation sheet 420 having different features.

In some examples, the main sheet 410 may be a perforated metal sheet and the foundation sheet 420 may be a non-perforated metal sheet. In other examples (not illustrated), the main sheet 410 may be a non-perforated metal sheet and the foundation sheet 420 may be a perforated metal sheet. The combined sheet 400 of FIG. 4 may include a first indentation feature 490 and a second indentation feature 495. In some examples, the main sheet 410 and the foundation sheet 420 are respectively composed of a variant of the same metal. That is, the main sheet 410 may be constructed of stainless steel and the foundation sheet 420 may be constructed of untreated steel, as stainless steel and untreated steel are each types of steel. It can be appreciated that when two different types of metals (e.g., steel and aluminum) are combined, over time, oxidization, galvanic corrosion, or other material by-products can form or result. Thus, it is desirable that the main sheet 410 and the foundation sheet 420 be respectively composed of the same metal or a variant of the same metal.

Figure 5A:
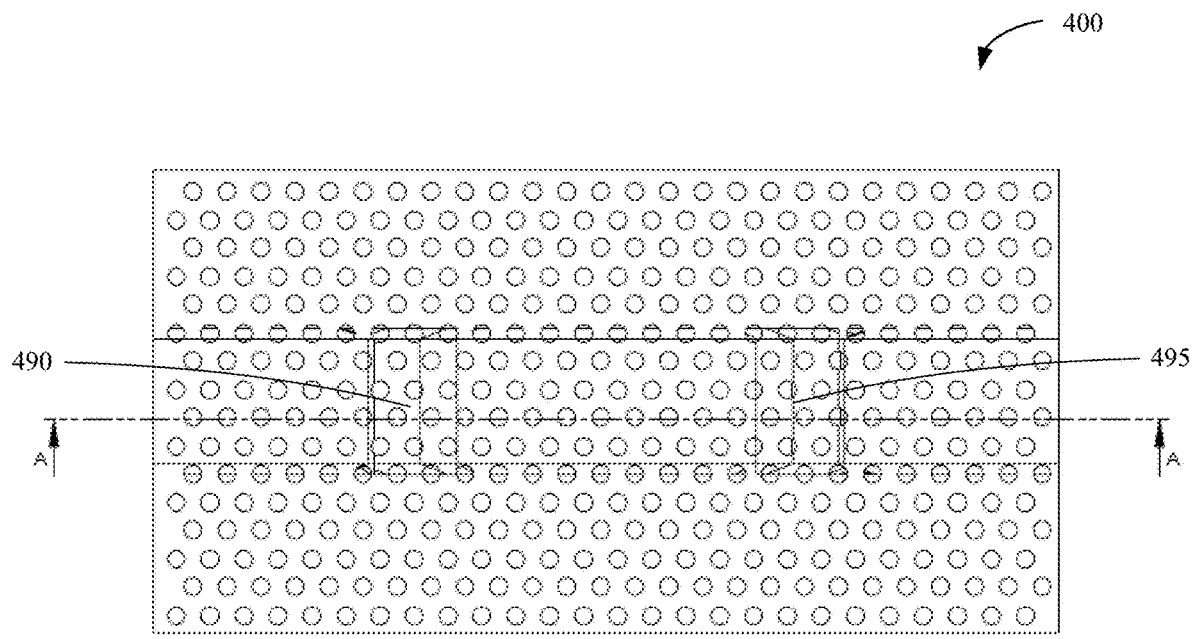
FIG. 5A illustrates a bottom view of the combined sheet of FIG. 4.

Reference is now made to FIG. 5A, which generally illustrates a bottom view of the combined sheet 400 of FIG. 4. The combined sheet 400 illustrated in FIG. 5A includes two indentation features. However, the combined sheet 400 may include any number of indentation features, where each indentation feature has a respective indentation direction that is different than an indentation direction of another indentation feature.

Similar to the combined sheet 100 illustrated in FIG. 2, the combined sheet 400 illustrated in FIG. 5A may have rotational symmetry about an indentation rotation point, where the indentation rotation point may be equidistant to the first indentation feature 490 and the second indentation feature 495.

Figure 5B:
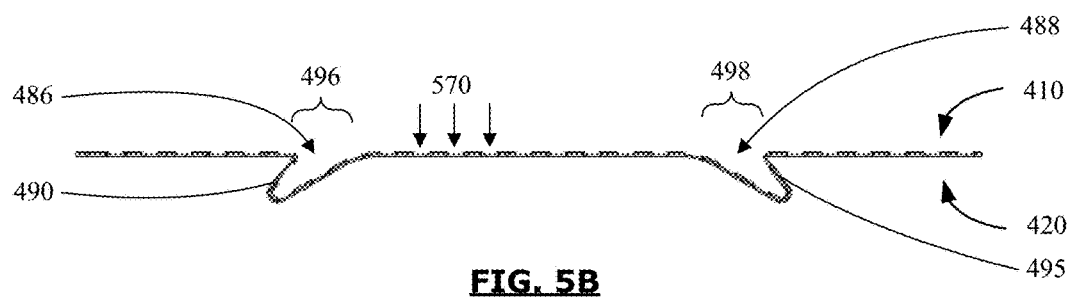
FIG. 5B illustrates a cross-sectional, elevation view of the combined sheet of FIG. 5A.

FIG. 5B illustrates a cross-sectional, elevation view of the combined sheet 400 of FIG. 5A taken along line A-A of FIG. 5A. The first indentation feature 490 and the second indentation feature 495 may protrude from a common side of the combined sheet 400 to form a first overhang cavity 486 and a second overhang cavity 488, respectively. The first overhang cavity 486 may have a first cavity opening 496 and the second overhang cavity 488 may have a second cavity opening 498. In FIG. 5B, the first cavity opening 496 is not adjacent the second cavity opening 498. In the example illustrated in FIG. 5B, the first indentation feature 490 and the second indentation feature 495 may protrude from a side occupied by the foundation sheet 420.

Although the first indentation feature 490 and the second indentation feature 495 may protrude from a common side of the combined sheet 400, in some examples, the first indentation feature 490 and the second indentation feature 495 may protrude from different sides. Examples of the indentation features protruding from different sides of the combined sheet will be illustrated in other examples described herein.

As described, the stretching process for joining the main sheet and the foundation sheet may produce indentation features. Producing the indentation features may produce indentation cavities, such as apertures or voids. Further, as the main sheet 410 illustrated in FIG. 5B is a perforated sheet, the combined sheet also includes a plurality of divots 570 (three example divots are identified with reference numeral 570 in FIG. 5B). The plurality of divots 570 correspond to the perforations in the main sheet 410. In some examples, the one or more of the divots 570 may be filled in with one or a combination of non-metal materials, such as epoxy, mineral wool, tar, paper clay (e.g., disposable product), or polystyrene foam (e.g., disposable product). In some examples, the respective indentation features (e.g., first indentation feature 490 and the second indentation feature 495) may also be filled with one or a combination of non-metal materials. It can be appreciated that when one or more of the divots 570 are filled in with a non-metal material, the resulting combination of the combined sheet and the non-metal material produces a product that can provide benefits of the respective component materials. For example, the combined sheet made of metal (e.g., perforated main sheet and non-perforated sheet) may form a structured barrier and the non-metal material received within the divots or the indentation features can provide, for example, thermal isolating or insulating properties to the resulting product for ameliorating or preventing condensation.

Figure 6A:
FIGS. 6A and 6B illustrate side elevation views of the combined sheet of FIG. 4.
Figure 6B:

Reference is now made to FIGS. 6A and 6B, which illustrate further side elevation views of the combined sheet 400 of FIG. 4. In FIG. 6A, the combined sheet 400 may be placed atop a further flat sheet 630 such that an entrance at the planar base of the respective indentation features may be closed.

In some examples, the indentation cavities may be filled with non-metal material. For example, as illustrated in FIG. 6B, the first overhang cavity 486 and the second overhang cavity 488 may respectively be filled with epoxy 636. In some other examples, the first overhang cavity 486 and the second overhang cavity 488 may be filled with one or a combination of non-metal materials, such as epoxy, mineral wool, tar, paper clay (e.g., disposable product), or polystyrene foam (e.g., disposable product). In some examples, the epoxy 636 may function akin to cement for providing structural integrity to the first indentation feature and the second indentation feature. That is, the epoxy 636 may increase the structural rigidness of the respective indentation features, such that the indentation features may be less prone to collapsing or to being crushed in a direction towards the plane of the combined sheet 400.

Figure 7A:
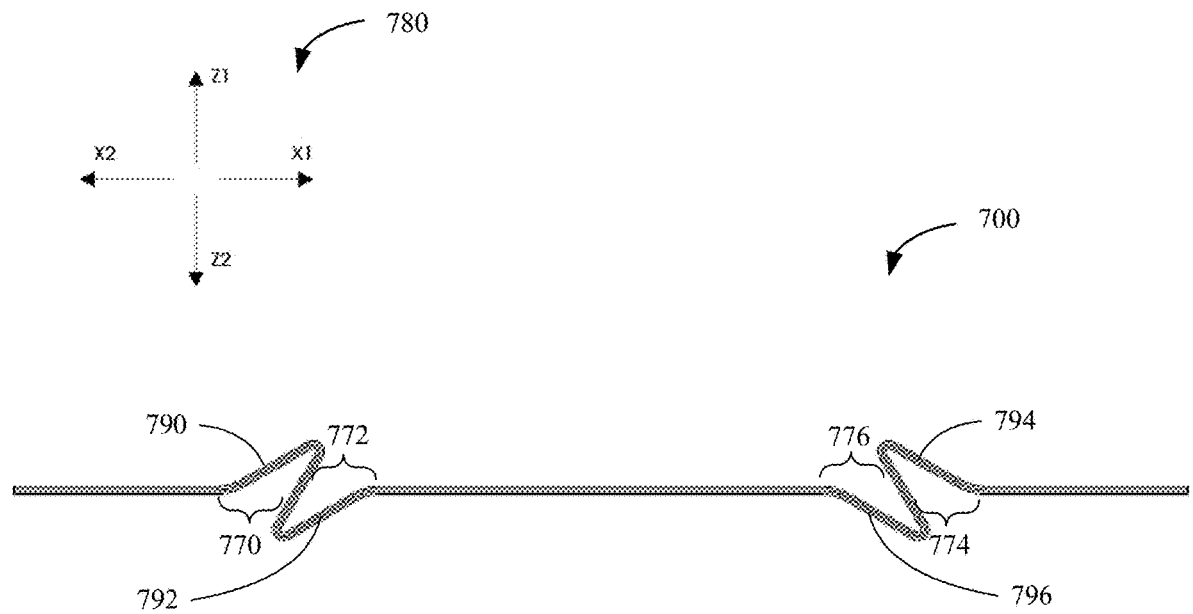
FIGS. 7A to 7C illustrate elevation, cross-sectional views of a combined sheet at various production stages of the combined sheet, in accordance with an example of the present application.
Figure 7B:
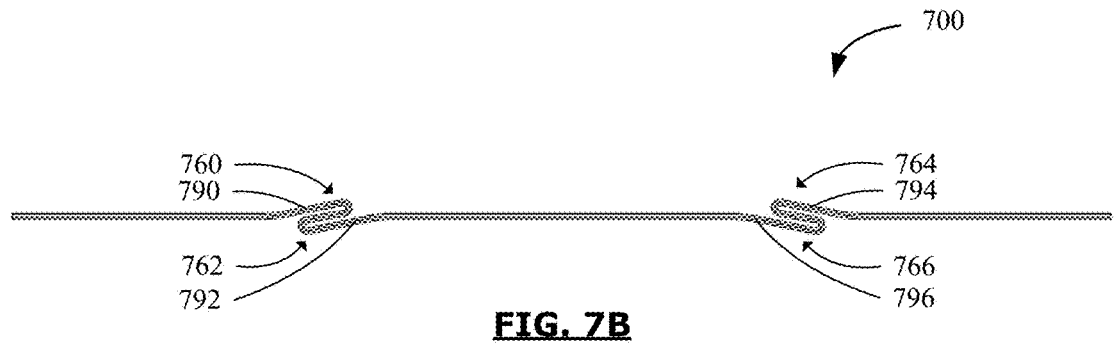
Figure 7C:

Reference is now made to FIGS. 7A to 7C, which illustrate elevation, cross-sectional views of a combined sheet 700 at various production stages of said combined sheet 700, in accordance with an example of the present application. Features of indentation features may be described with reference to a Cartesian coordinate space, where direction may be referenced according to an illustrated compass rose 780.

FIG. 7A illustrates a combined sheet 700 including a main sheet joined to a foundation sheet. The combined sheet 700 may include a first indentation feature 790, a second indentation feature 792, a third indentation feature 794, or a fourth indentation feature 796. Four indentation features are illustrated in FIG. 7A, however the combined sheet 700 may include any number of indentation features.

In FIG. 7A, the first indentation feature 790 and the third indentation feature 794 protrude from a different side of the combined sheet 700 than the second indentation feature 792 and the fourth indentation feature 796 from the combined sheet 700. The respective indentation features may be formed during an embossing or stretching process, where a double action press is used for forming the respective indentation features.

In FIG. 7A, the first indentation feature 790 may provide a first overhang and may have a first indentation direction including a combination of the positive x-direction and positive z-direction. The second indentation feature 792 may provide a second overhang and may have a second indentation direction including a combination of the negative x-direction and negative z-direction. In some examples, the first indentation direction may be substantially opposite to the second indentation direction, as illustrated in FIG. 7A.

The third indentation feature 794 may provide a third overhang and may have a third indentation direction including a combination of the negative x-direction and the positive z-direction. The fourth indentation feature 796 may provide a fourth overhang and may have a fourth indentation direction including a combination of the positive x-direction and negative z-direction. In the example combined sheet 700 illustrated in FIG. 7A, the respective indentation features have an indentation direction different than at least one other indentation feature of the combined sheet 700.

The first overhang includes a first cavity opening 770 and the second overhang includes a second cavity opening 772. Similarly, the third overhang includes a third cavity opening 774 and the fourth overhang includes a fourth cavity opening 776. In some examples, the first indentation feature 790 may provide the first overhang over the second cavity opening 772. Similarly, the second indentation feature 792 may provide the second overhang over the first cavity opening 770. In the foregoing example, although the first indentation feature 790 and the second indentation feature protrude from or extend from opposite sides of the combined sheet, the first cavity opening 770 may be adjacent to the second cavity opening 772, as illustrated in FIG. 7A.

Similarly, the third indentation feature 794 may provide the third overhang over the fourth cavity opening 776 and the fourth indentation feature 796 may provide the fourth overhang over the third cavity opening 774. The third cavity opening 774 may be adjacent to the fourth cavity opening 776, as illustrated in FIG. 7A.

Other examples of indentation feature configurations may be contemplated. For example, a first indentation feature and a second indentation feature may protrude from a common side of the combined sheet, where the respective indentation features provide overhangs in different directions to prohibit separation of the foundation sheet from the main sheet. In this example, it can be contemplated that the respective overhang cavity openings can be adjacent.

The indentation features of the combined sheet 700 in FIG. 7A may be formed using a double action press. An example double action press will be described and illustrated in a subsequent embodiment herein. FIG. 7A illustrates a first stage in formation of a combined sheet 700, where the respective indentation features are formed using one or more punches. The foundation sheet may be joined to the main sheet for forming the combined sheet 700 based at least on: (1) the joints produced using the punch of a double action press at each of the respective indentation features; or (2) binding forces due in part to the spatial direction of a given indentation feature relative to another indentation feature, such that separating the foundation sheet from the main sheet may require that the general shape of the respective indentation features need to be deformed.

FIG. 7B illustrates a subsequent stage in formation of the combined sheet 700. The combined sheet 700 illustrated in FIG. 7A are subsequently pressed or rolled such that the respective indentation features are manipulated to be nearer to the plane of the combined sheet 700. For example, the first overhang 760 (identified in FIG. 7B) of the first indentation feature 790 may be pressed or rolled nearer to the second cavity opening of the adjacent second indentation feature 792. The second overhang 762 (identified in FIG. 7B) of the second indentation feature 792 may be pressed or rolled nearer to the first cavity opening of the adjacent first indentation feature 790.

Similarly, the third overhang 764 (identified in FIG. 7B) of the third indentation feature 794 may be pressed or rolled nearer to the fourth cavity opening of the adjacent fourth indentation feature 796. The fourth overhang 766 (identified in FIG. 7B) of the fourth indentation feature 796 may be pressed or rolled nearer to the third cavity opening of the adjacent third indentation feature 794.

In some examples, it may be desirable to produce a substantially planar or flat combined sheet. Accordingly, it may be desirable to press or roll a combined sheet including indentation features into a substantially planar or flat product.

FIG. 7C illustrates a subsequent stage in formation of the combined sheet 700. The combined sheet 700 may be subsequently pressed or rolled such that the respective indentation features become substantially co-planar with a general plane of the combined sheet 700.

In some examples, production of the combined sheet 700 may not include pressing or rolling said combined sheet 700 to be substantially planar or flat. Material properties of the main sheet or the foundation sheet may make it undesirable or impractical to do so. For example, if rolling or pressing the indentation features to be substantially co-planar with the combined sheet 700 required that the metal be stretched past a point of fracture, it may be desirable in some examples to produce the combined sheet 700 illustrated in FIG. 7B without any further subsequent pressing or rolling.

Reference is now made to FIGS. 8A to 8D, which illustrate elevation, cross-sectional views of a combined sheet 800 at different stages of production of said combined sheet 800, in accordance with another example of the present application. Indentation features may be described with reference to a Cartesian coordinate space, where direction may be referenced according to an illustrated compass rose 880.

Figure 8A:
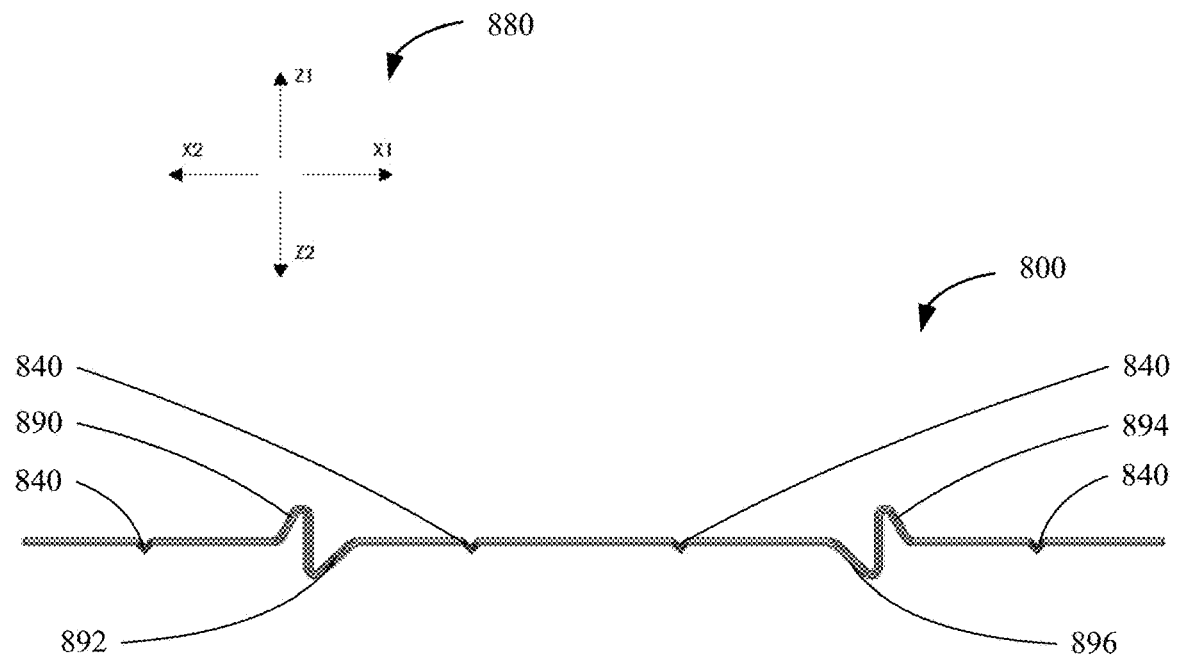
FIGS. 8A to 8D illustrate elevation, cross-sectional views of a combined sheet at various stages of production of the combined sheet, in accordance with another example of the present application.

Similar to the combined sheet 700 illustrated in FIG. 7A, in FIG. 8A, the combined sheet 800 may include a first indentation feature 890, a second indentation feature 892, a third indentation feature 894, and a fourth indentation feature 896. The indentation features illustrated in FIG. 8A may be formed using a double action press. However, other methods of forming the indentation features may be contemplated, such as a rolling punch apparatus.

The indentation features illustrated in FIG. 8A may have an indentation direction that is substantially perpendicular or normal to the surface of the combined sheet 800. In contrast, the combined sheet 700 illustrated in FIG. 7A may have respective indentation directions that are not substantially perpendicular or normal to the surface of the combined sheet 700.

The combined sheet 800 of FIG. 8A may also include one or more embossed or stretched indentations 840. The stretched indentations may be located at periodic locations across the combined sheet 800 and are joints for joining a foundation sheet of the combined sheet 800 to the main sheet of the combined sheet 800. In FIG. 8A, the foundation sheet is joined to the main sheet based at least on joints formed by: (1) the first indentation feature 890, the second indentation feature 892, the third indentation feature 894, the fourth indentation feature 896; and (2) the one or more stretched indentations 840 located at various locations across the surface of the combined sheet 800.

Figure 8B:
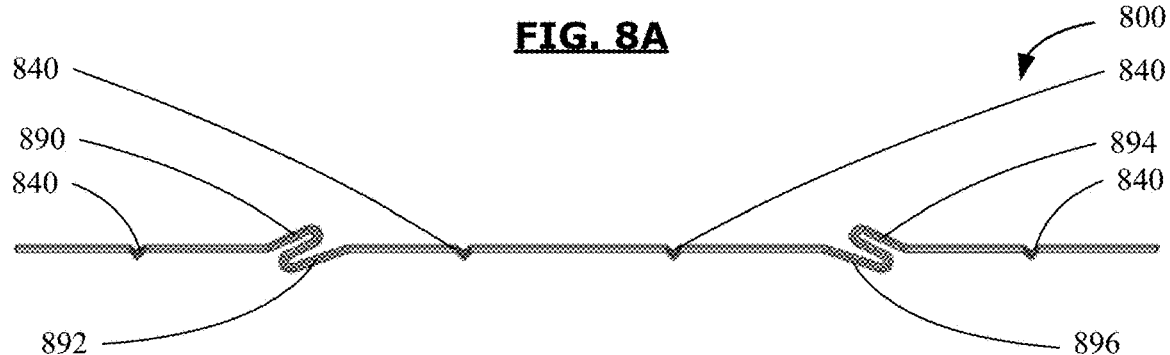
Figure 8C:
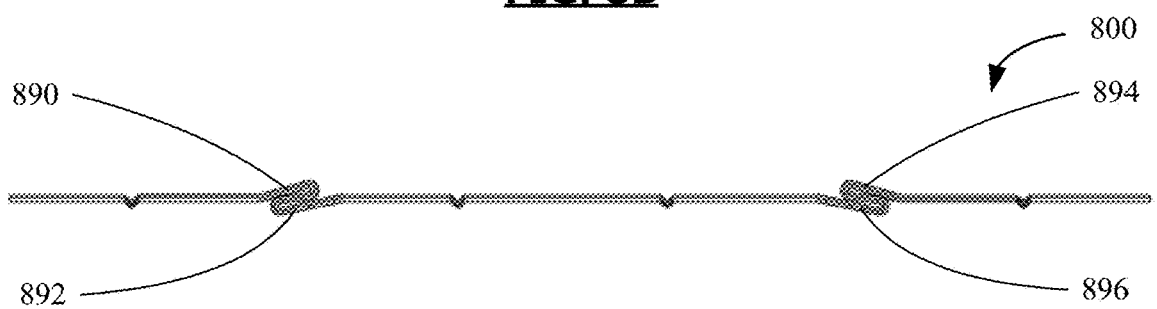

FIGS. 8B and 8C illustrate a subsequent stage and a further subsequent stage in formation of the combined sheet 800 that was illustrated in FIG. 8A. The combined sheet 800 may subsequently be pressed or rolled such that the respective indentation features are located nearer to the surface of the combined sheet 800. Similar to the illustration in FIG. 7B, the respective indentation features may include an indentation angle that may be nearer to 0 degrees.

Figure 8D:

FIG. 8D illustrates another subsequent stage in formation of the combined sheet 800. The combined sheet 800 may be pressed or rolled such that the respective indentation features or the stretched indentations 840 may become substantially co-planar with the general plane of the combined sheet 800.

Figure 9A:
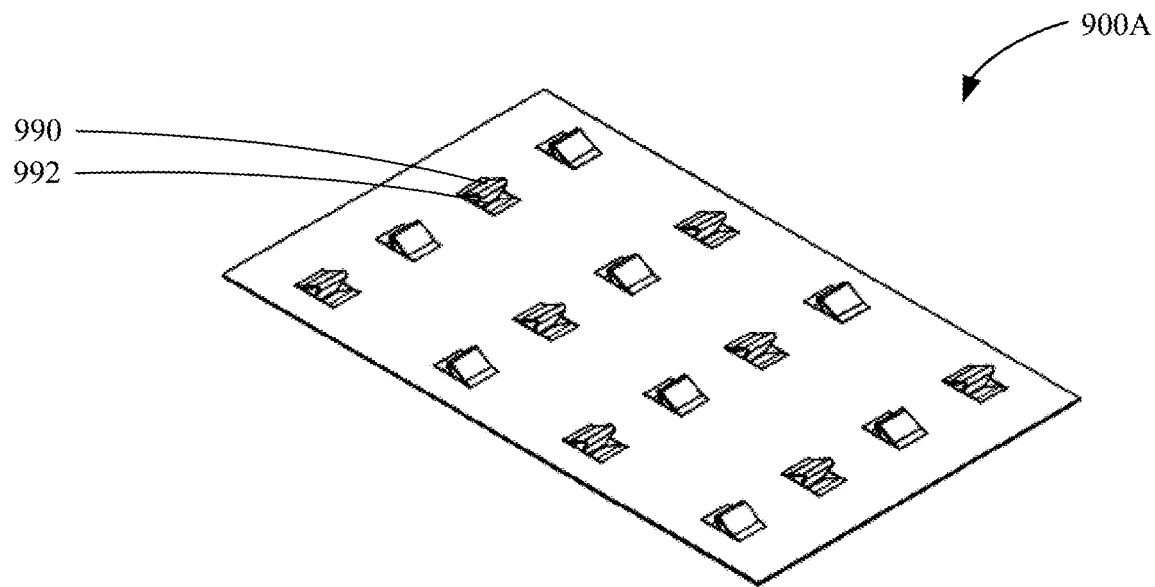
FIGS. 9A and 9B illustrate perspective views of combined sheets, in accordance with further examples of the present application.
Figure 9B:
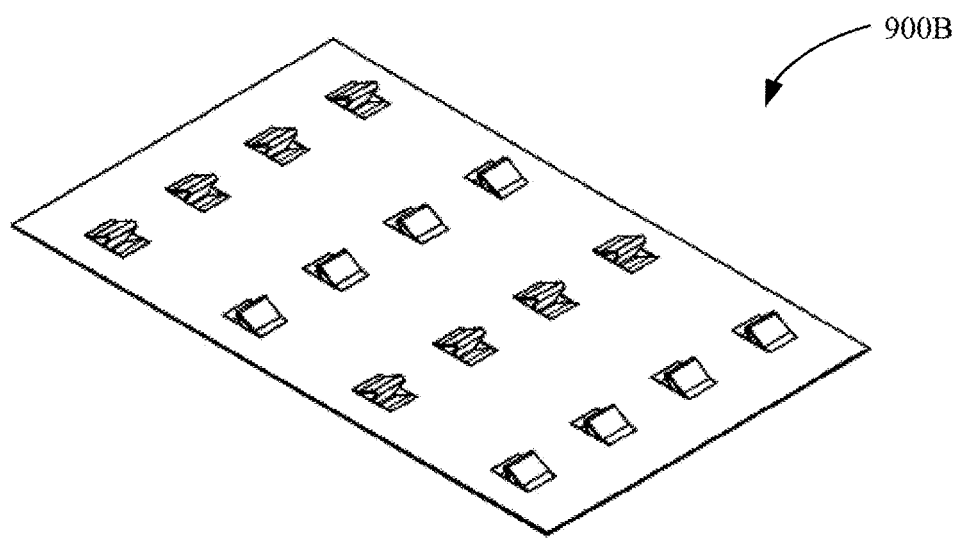

Reference is now made to FIGS. 9A and 9B, which illustrate perspective views of combined sheet, in accordance with further examples of the present application. In FIG. 9A, the combined sheet 900A includes a plurality of indentation features across the combined sheet. For illustration, the combined sheet 900A may include a first indentation feature 990 and a second indentation feature 992, where a first indentation direction of the first indentation feature 990 and a second indentation direction of the second indentation feature 992 may be in opposite directions. The first indentation feature 990 and the second indentation feature 992 may be similar to the first indentation feature 790 and the second indentation feature 792 of FIG. 7A.

In FIG. 9A, the first indentation feature 990 and the second indentation feature 992 may be grouped such that an overhang cavity opening of the first indentation feature 990 may be adjacent to an overhang cavity opening of the second indentation feature 992. In FIG. 9A, groups of indentation features may be formed in an alternating direction relative to an adjacent group of indentation features. In FIG. 9B, the combined sheet 900B includes groups of indentation features having indentation directions that may alternate from a row of groups of indentation features to a subsequent row of groups of indentation features. It can be appreciated that the perspective views of the example combined sheets in FIGS. 9A and 9B may correspond to the combined sheet 800 illustrated in FIG. 8B. That is, the perspective views of the combined sheets in FIGS. 9A and 9B may be a result of a method step where respective indentation features have been pressed or rolled such that the respective indentation features are located nearer to the surface of the combined sheet. Further, it can be appreciated that a plurality of indentation features may be provided to produce a combined sheet, and that the plurality of indentation features may be arranged to collectively form a pattern on the surface of the combined sheet. It will be understood that the illustrated examples of indentation features forming a pattern are illustrative and not restrictive, and that the pattern of indentation features can vary or be different from a combined sheet to another combined sheet.

Figure 10A:
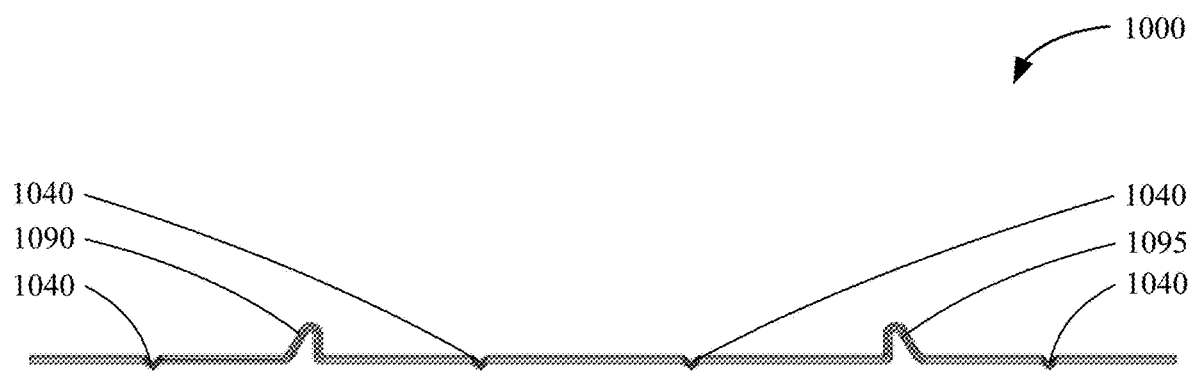
FIGS. 10A and 10B illustrate elevation, cross-sectional views of a combined sheet at different production stages of the combined sheet, in accordance with another example of the present application.
Figure 10B:

Reference is now made to FIGS. 10A and 10B, which illustrate elevation, cross-sectional views of a combined sheet 1000 at different production stages of said combined sheet 1000, in accordance with an example of the present application.

The combined sheet 1000 includes a first indentation feature 1090 and a second indentation feature 1095. The first indentation feature 1090 may be spaced from the second indentation feature 1095. The combined sheet 1000 may include one or more stretched indentations 1040 across the surface of the combined sheet 1000. The stretched indentations 1040 may be similar to the stretched indentations 840 of FIG. 8 and may be formed as joints for joining a foundation sheet of the composite plate 1000 to a main sheet of the combined sheet 1000.

In FIG. 10A, the first indentation feature 1090 and the second indentation feature 1095 may have indentation directions that are substantially normal to or perpendicular to a general plane of the combined sheet 1000.

FIG. 10B illustrates a subsequent stage in formation of the combined sheet 1000 that was illustrated in FIG. 10A. The combined sheet 1000 may be subsequently pressed or rolled such that the respective indentation features may be located nearer to the surface of the combined sheet 1000. In FIG. 10A, the respective indentation features may have an indentation angle of substantially 90 degrees. Subsequently, the respective indentation features may be rolled or pressed such that the respective indentation features may have an indentation angle that is an acute angle. For example, in FIG. 10B, the respective indentation features may be rolled or pressed such that the respective indentation angles may be an acute angle, such as 85 degrees, 45 degrees, 25 degrees, 10 degrees, or any angle less than 90 degrees. In FIG. 10B, a respective indentation feature may be oriented in a spatial direction that is different than another spatial direction of another indentation feature. As described, when an indentation feature may be oriented in a spatial direction that is different than another spatial direction of another indentation feature, the indentation features oriented in different directions may provide binding forces for joining a main sheet to a foundation sheet due in part to the spatial orientation of the respective indentation features. When the respective indentation directions are different, separating the foundation sheet from the main sheet may require that the general shape of the respective indentation features be deformed.

The examples described herein include joining a foundation sheet to a main sheet for producing a combined sheet. In some examples, the term "sheet" may be utilized for describing material having a thickness of 3 mm or less. Further, in some examples, the term "plate" may describe material having a thickness of more than 3 mm. The features described herein may be implemented for both combined sheet materials and combined plate materials. In some examples, the terms "sheet" and "plate" may be used interchangeably and should be considered to be illustrative and not restrictive.

In some examples described herein, the example combined sheets include at least a foundation sheet joined to a main sheet. That is, the combined sheet includes joining of two layers. In some other examples, any number of sheets may be joined via the features, methods, or apparatus described herein. For example, at least one additional sheet abutting a foundation sheet/main sheet combination may be joined to the foundation sheet/main sheet combination to form another example combined sheet. For example, the at least one additional sheet may include indentation features crimped to indentation features of the foundation sheet/main sheet combination. For example, referring again to the combined sheet 100 of FIG. 1C, at least one additional sheet may include a first additional indentation feature crimped to the first foundation indentation feature 122 and a second additional indentation feature may be crimped to the second foundation indentation feature 124 for joining the additional sheet to the foundation sheet 120 and the main sheet 110.

The description herein provides numerous examples of combined sheets including a foundation sheet joined to a main sheet. A foundation sheet may be joined to a main sheet when two or more indentation features form joints and when respective indentation directions of the two or more indentation features are in different spatial directions. The features of the combined sheets described herein may ameliorate some disadvantages of utilizing one or more joints (e.g., embossed joints) oriented in a single or unitary spatial direction.

When combined sheets including features described herein are produced, said combined sheets may be cut and/or shaped into products for subsequent stages of product manufacturing.

Figure 11A:
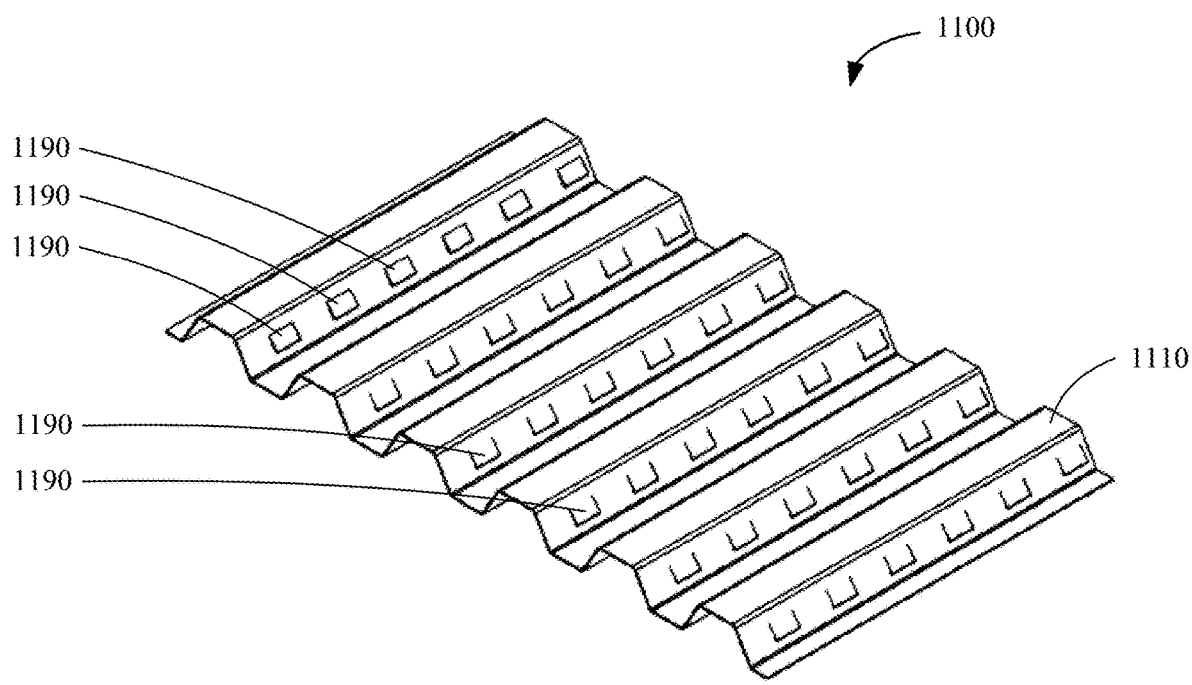
FIGS. 11A and 11B illustrate a perspective view and an elevation, cross-sectional view, respectively, of a corrugated panel formed from a combined sheet, in accordance with an example of the present application.
Figure 11B:
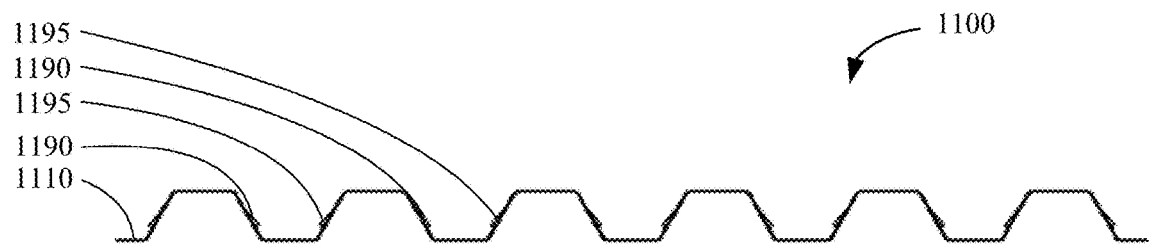

Reference is now made to FIGS. 11A and 11B, which illustrate a corrugated panel 1100 formed from a combined sheet 1110, in accordance with an example of the present application. FIG. 11A illustrates a perspective view of a combined sheet 1110 shaped into a corrugated panel 1100. The combined sheet 1110 may include a plurality of first indentation features 1190. The first indentation features 1190 may be located periodically across a surface of the combined sheet 1110. Once the first indentation features 1190 are formed, the combined sheet 1110 may be shaped into the corrugated panel 1100.

FIG. 11B illustrates an elevation cross-section view of the corrugated panel 1100 of FIG. 11A. In some examples, the first indentation features 1190 may be periodically spaced such that the first indentation features 1190 are located at regular intervals of the corrugated pattern. The combined sheet 1110 may also include second indentation features 1195 located at regular intervals of the corrugated pattern. Before the combined sheet 1110 may be shaped into the corrugated panel 1100, the first indentation features 1190 may be oriented in a first direction and the second indentation features 1195 may be oriented in a second direction, such that the first direction is different than the second direction.

Figure 12A:
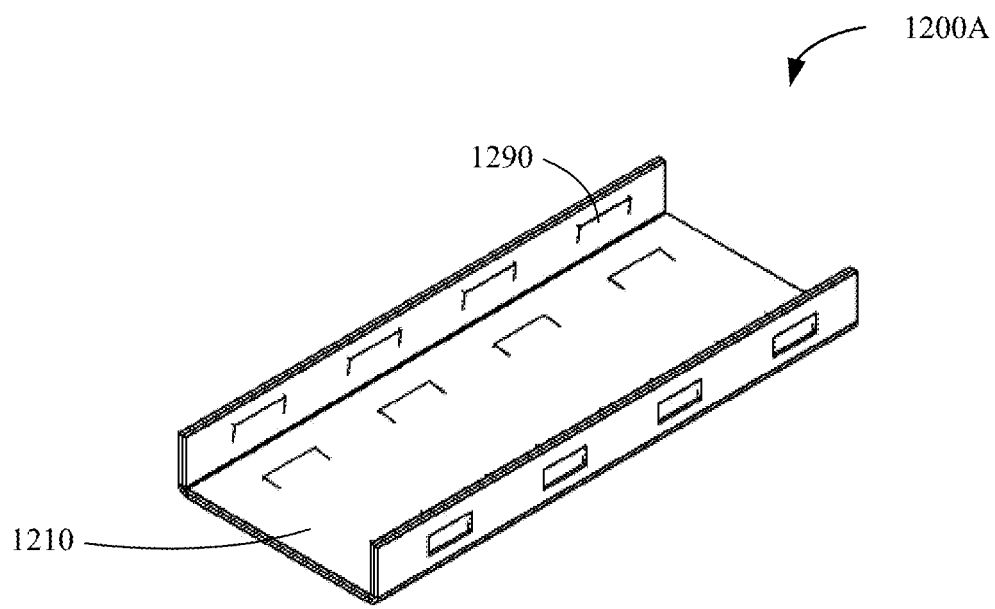
FIGS. 12A and 12B illustrate perspective views of structural steel profiles, in accordance with examples of the present application.
Figure 12B:
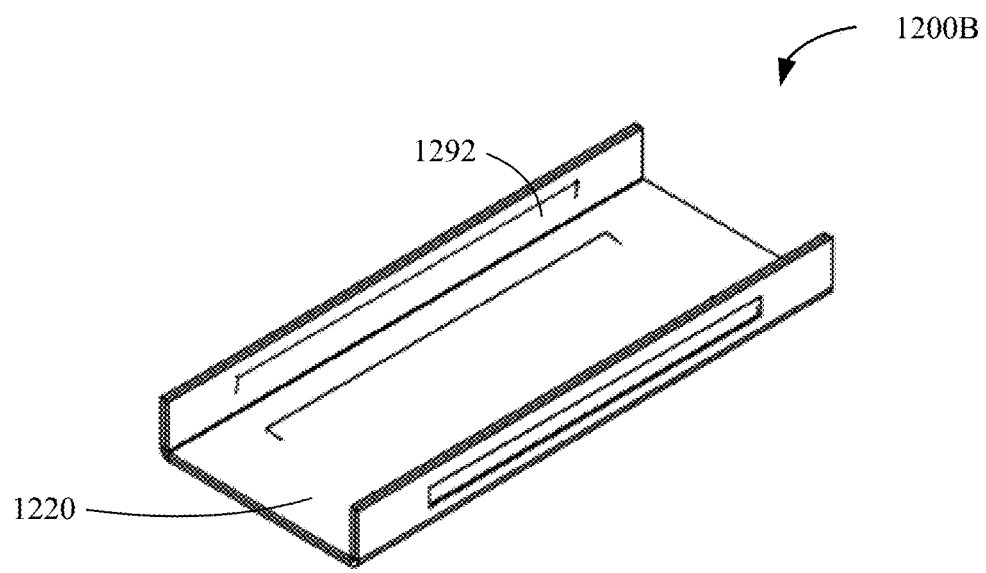

Reference is now made to FIGS. 12A and 12B, which illustrate perspective views of a first structural steel profile 1200A and a second structural steel profile 1200B, in accordance with an example of the present application. In FIG. 12A, the first structural steel profile 1200A may be formed from a first combined sheet 1210 having a plurality of indentation features 1290. Once indentation features 1290 are formed, the first combined sheet 1210 may be roll formed, for example, to provide the first structural steel profile 1200A.

In FIG. 12B, the second structural steel profile 1200B may be formed from a second combined sheet 1220 having a plurality of indentation features 1292. The indentation features 1292 in FIG. 12B may have a different overall length than the overall length of the indentation features 1290 in FIG. 12A. Once indentation features 1292 are formed, the second combined sheet 1220 may similarly be roll formed, for example, to provide the second structural steel profile 1200B.

Figure 13A:
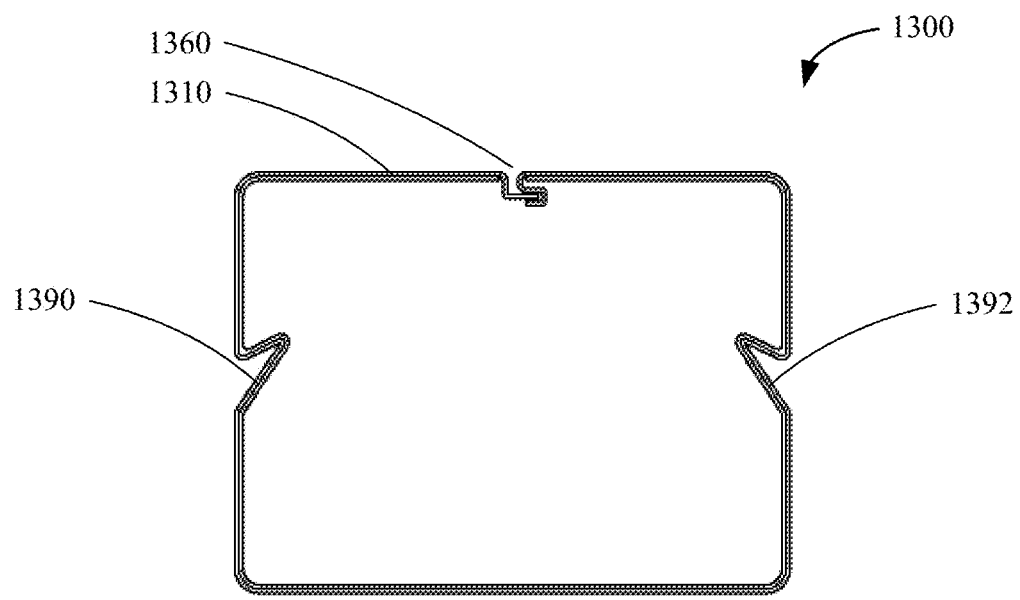
FIGS. 13A and 13B illustrate an elevation, cross-sectional view and a perspective view, respectively, of a conduit structure formed from a combined sheet, in accordance with an example of the present application.
Figure 13B:
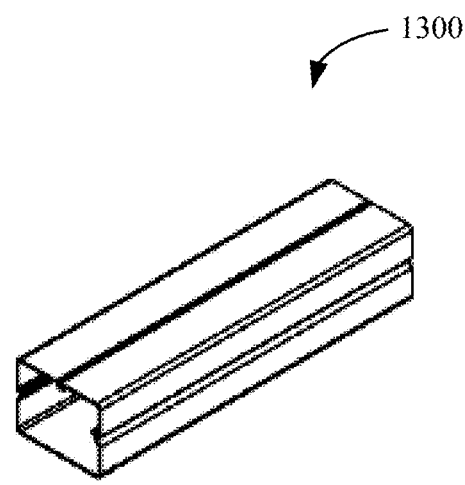

Reference is now made to FIGS. 13A and 13B, which illustrate a conduit structure 1300 formed from a combined sheet 1310, in accordance with an example of the present application. The combined sheet 1310 may include a main sheet and a foundation sheet that are joined. The foundation sheet may be joined to the main sheet via a first indentation feature 1390 and a second indentation feature 1392. The first indentation feature 1390 and the second indentation feature 1392 may be similar to the indentation features described herein and may be formed by embossing or stretching steps. Before the combined sheet 1310 may be formed into the conduit structure 1300, the first indentation feature 1390 may be formed such that a first indentation direction of that first indentation feature 1390 may be in a different direction than a second indentation direction of the second indentation feature 1392. Accordingly, the foundation sheet may be joined to the main sheet via indentation features spatially oriented in different directions.

In some examples, once the combined sheet 1310 is produced, the combined sheet 1310 may be roll formed to produce the conduit structure 1300. Roll forming the combined sheet 1310 is one example of producing the conduit structure 1300, however other methods of producing the conduit structure 1300 from the combined sheet 1310 may be contemplated.

In some examples, two or more sheet materials may be joined to a main sheet. It may be desirable to join sheet materials that may be placed adjacent to another, such that the combination of joined sheet materials may be more rigid or may be more resistant to bending. In some examples, it may be desirable to join sheet materials having variant properties. For example, it may be desirable to join an untreated steel sheet to stainless steel sheet for producing building structures. The stainless steel sheet may face a weathered environment, whereas the untreated steel sheet may face a temperate environment. When two or more indentation features may be formed for joining two or more sheet materials, adhesives or other adhesive like materials may not be required thereby reducing material costs for producing combined sheets. It can be appreciated when two different types of metals are combined, over time, galvanic corrosion, oxidization or other material by-products can result. Thus, it is desirable that each of the two or more sheet materials be respectively composed of the same metal or a variant of the same metal (e.g., stainless steel being a variant of steel).

In some examples, the conduit structure 1300 may include an edge formation 1360 for joining edges of the combined sheet 1310 for forming the conduit structure 1300.

Figure 14:
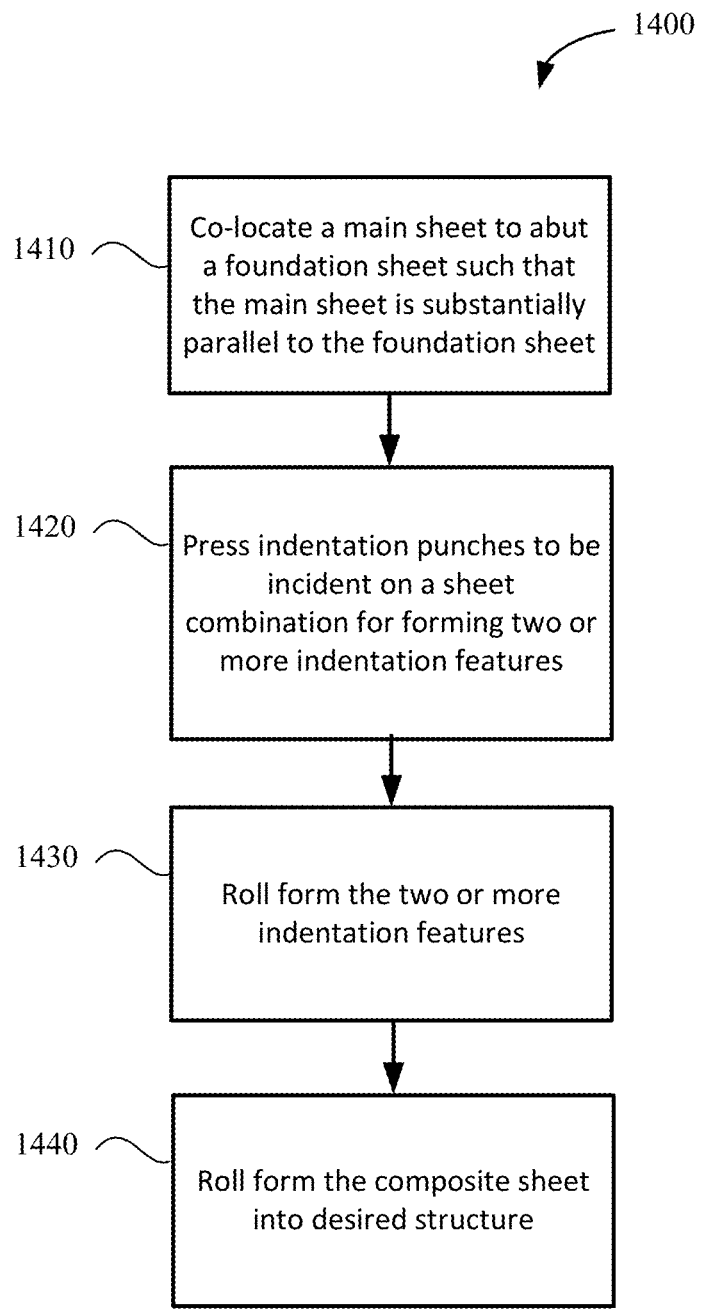
FIG. 14 illustrates a method of producing a combined sheet, in accordance with an example of the present application.

Reference is now made to FIG. 14, which illustrates a method 1400 of producing a combined sheet, in accordance with an example of the present application. The combined sheet may include a main sheet and a foundation sheet. The method 1400 may be implemented by a machine or a collection of machines along a production line for producing the combined sheet.

At 1410, the machine may be configured to co-locate the main sheet to abut the foundation sheet such that the main sheet may be substantially parallel to the foundation sheet. In some examples, the foundation sheet may be placed atop the main sheet, such that the foundation sheet may be abutting the main sheet, and the combination of sheets may be conveyed through or along a production line.

At 1420, the machine may be configured to press one or more indentation punches to be incident on a sheet combination including the main sheet and the foundation sheet for forming two or more indentation features. In some examples, the punch may include a double action press that may provide a non-penetrating force to the sheet combination for forming the indentation features. The indentation features may include those described herein. In other examples, a plurality of punches may be provided on a roller and the roller may be configured to press the plurality of punches on the sheet combination being conveyed along the production line.

In some examples, the two or more indentation features may include a first indentation feature including a first main indentation feature providing a first overhang over a first portion of the main sheet. The first indentation feature may include a first foundation indentation feature crimped to the first main indentation feature. The two or more indentation features may also include a second indentation feature including a second main indentation feature providing a second overhang over a second portion of the main sheet. The second indentation feature may include a second foundation indentation feature crimped to the second main indentation feature. The first overhang and the second overhang may be overhangs in different directions to prohibit separation of the foundation sheet from the main sheet. The two or more indentation features may collectively be formed for joining the foundation sheet to the main sheet.

In some examples, the indentation punches may include a first indentation punch and a second indentation punch. At 1420, when pressing the indentation punch to be incident on the sheet combination, the machine may be configured to: (a) press the first indentation punch to be incident on the sheet combination to translate a force in a direction normal to a surface of the sheet combination into a force in a first direction; and (b) press the second indentation punch to be incident on the sheet combination to translate a force in a direction normal to a surface of the sheet combination into a force in the second direction. In some examples, the first direction may be different than the second direction. In some examples, described below, the first direction and the second direction may both be a direction that may be substantially normal to or perpendicular to the general plane of the sheet combination and the indentation features may be subsequently formed. In some examples, pressing the first indentation punch and the second indentation punch may be performed substantially simultaneously. In some examples, the pressing of the first indentation punch may be offset in time from the pressing of the second indentation punch.

In some examples described herein, indentation features may be formed by one or more stages. For instance, the machine may be configured to press the indentation punch in a direction that is normal to the combined sheet surface to form two or more indentation features having indentation directions defined by a normal direction that is perpendicular to the combined sheet. For example, referring again to FIG. 10A as an illustrative example, at 1420, the machine may be configured to press the indentation punches to be incident on the sheet combination for forming indentation features having indentation directions that are substantially normal to or perpendicular to the plane of the sheet combination.

Referring again to FIG. 10B as an illustrative example, at 1430, the machine may be configured to roll form the two or more indentation features such that a first indentation feature is roll formed in a first indentation direction and a second indentation feature is roll formed in the second indentation direction. That is, in FIG. 10B, the first indentation feature 1090 may be pressed or rolled such that the first indentation direction is a combination of the positive x-direction and the positive y-direction. Further, the second indentation feature 1095 may be pressed or rolled such that the second indentation direction is a combination of the negative x-direction and the positive y-direction. The operation at 1430 may provide a combined sheet that may be cut or shaped for producing other finished products.

In some examples, where desirable and where the materials may have large material plasticity to be rolled or pressed without fracturing, the machine may be configured to press or roll the respective indentation features such that the combination sheet is a planar sheet or a flat sheet. That is, in some examples, the machine may be configured to roll mill the combination sheet having indentation features into a flat sheet, such that the first indentation feature and the second indentation feature become planar with the surface of the combination sheet. In some examples, the machine may be configured to press the combination sheet having the indentation features into a flat sheet using a flat press. In some other examples, to increase plasticity of the sheet materials being rolled or pressed, the methods described herein may include heating steps. That is, heating the sheet materials can result in greater sheet material malleability. Increasing plasticity using heat of the sheet material may be desirable when producing a flat combined sheet having the features described herein. For example, metals may not have sufficient plasticity for indentation features to be rolled or pressed without causing metal fractures. Thus, it may be desirable to include method steps for heating the sheet material during one or more method steps described herein.

At 1440, the machine may be configured to roll form the combined sheet into various structures. For example, the machine may be configured to roll form the combined sheet into example corrugated panels (see e.g., FIGS. 11A, 11B), example structural steel profile (see e.g., FIG. 12A, 12B), or example conduit structures (see e.g., FIG. 13A, 13B).

Figure 15A:
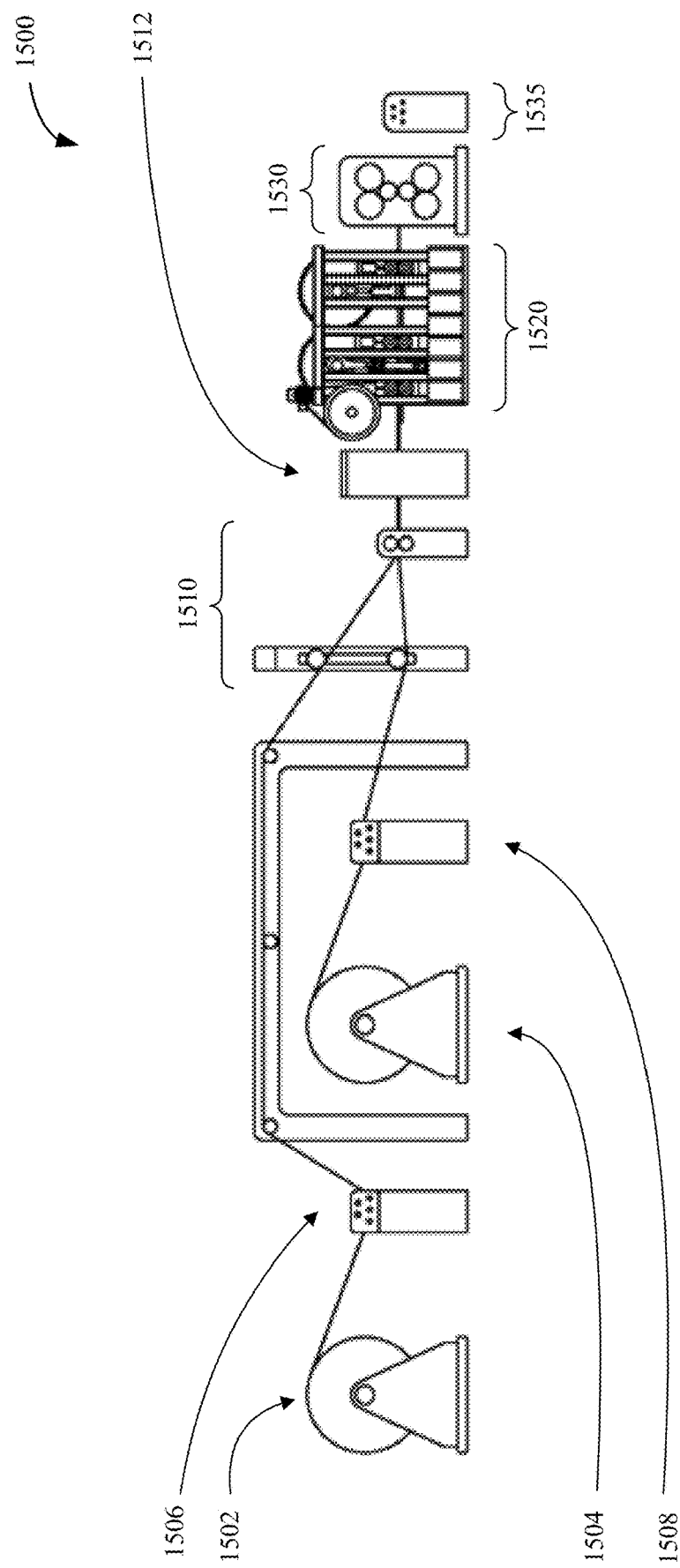
FIGS. 15A and 15B illustrate a side elevation view and a perspective view, respectively, of a machine including a combination of stages for producing a combined sheet, in accordance with an example of the present application.
Figure 15B:
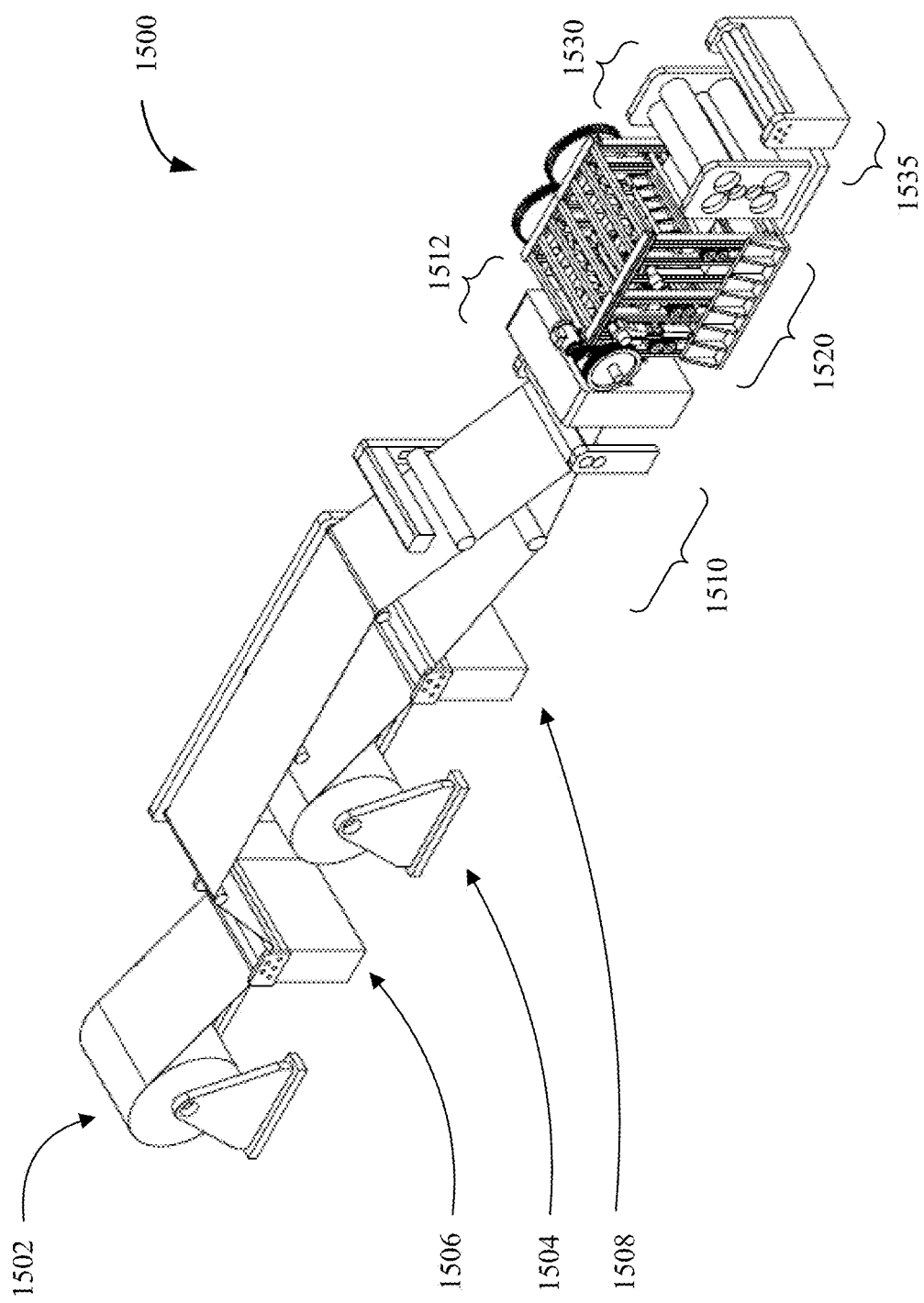

Reference is now made to FIGS. 15A and 15B, which illustrate a machine 1500 including a combination of stages for producing a combined sheet including a main sheet and a foundation sheet, in accordance with an example of the present application. FIG. 15A illustrates a side elevation view of the machine depicting example stages of the machine for producing a combined sheet. FIG. 15B illustrates a perspective view of the machine illustrated in FIG. 15A.

The machine 1500 includes a first coil opener 1502 and a second coil opener 1504. The first coil opener 1502 may be for unravelling one of a foundation sheet or a main sheet. The second coil opener 1504 may be for unravelling another one of a main sheet or a foundation sheet. In some examples, the main sheet or the foundation sheet may be a metal sheet. In some examples, the main sheet or the foundation sheet may be perforated sheets or non-perforated sheets.

The machine 1500 includes a first leveler 1506 and a second leveler 1508. The first leveler 1506 may be downstream from the first coil opener 1502. The second leveler 1508 may be downstream from the second coil opener 1504. The first leveler 1506 and the second leveler 1508 may be for conditioning and positioning sheet material being conveyed along the machine and to be fed into a feeding system 1510.

The machine 1500 includes the feeding system 1510. The feeding system 1510 may be configured for positioning or co-locating the main sheet to abut the foundation sheet such that the main sheet may be parallel to the foundation sheet. The feeding system 1510 may be downstream from each of the first leveler 1506 and the second leveler 1508.

The machine 1500 may include a heater 1512 downstream from the feeding system 1510. The heater 1512 may increase the temperature of the foundation sheet and the main sheet material being conveyed through the machine. The foundation sheet and the main sheet may be heated, for example, to increase the material plasticity of the respective sheet materials for forming indentation features or for roll forming the sheet materials into finished products, such as structures.

The machine 1500 may include a double action press 1520 for forming indentation features on the sheet materials for joining the foundation sheet to the main sheet. The indentation features may include features described in the present application. In some examples, the double action press 1520 may include punches on both a top plate and a bottom plate such that a subset of indentation features formed in the sheet materials may protrude from a top portion of the combined sheet and another subset of indentation features formed in the sheet materials may protrude from a bottom portion of the combined sheet. For example, the double action press 1520 may be configured to form indentation features to produce the combined sheet illustrated in FIG. 8A. In FIG. 8A, indentation features are illustrated to be grouped in pairs, where indentation features in a pair may have a respective overhang cavity opening that is adjacent to another overhang cavity opening. In some other examples, the double action press 1520 may be configured to form indentation features such that respective overhang cavity openings are spaced apart from other overhang cavity openings. In some other examples, the double action press 1520 may be configured to form indentation features in the sheet materials such that the indentation features protrude from a single side of the combined sheet. In some examples, the double action press 1520 may be configured to perform a two step process, including: (1) pressing punches to be incident on the sheet materials for producing the indentation features; and (2) rolling or pressing the respective indentation features such that an overhang or indentation surface may be nearer to the plane of the combined sheet than before said step (2).

The machine 1500 may include a mill roll former 1530 for further forming the produced combined sheet. The mill roll former 1530 may be downstream from the double-action press machine. In some examples, the mill roll former 1530 may be an optional production stage.

The machine 1500 may include a combined sheet leveler 1535 that is downstream from the double action press 1520. The combined sheet leveler 1535 may condition the produced combined sheet (e.g., including the foundation sheet joined to the main sheet) for subsequent stages in the production process for producing finished products that incorporate the produced combined sheet.

Figure 16A:
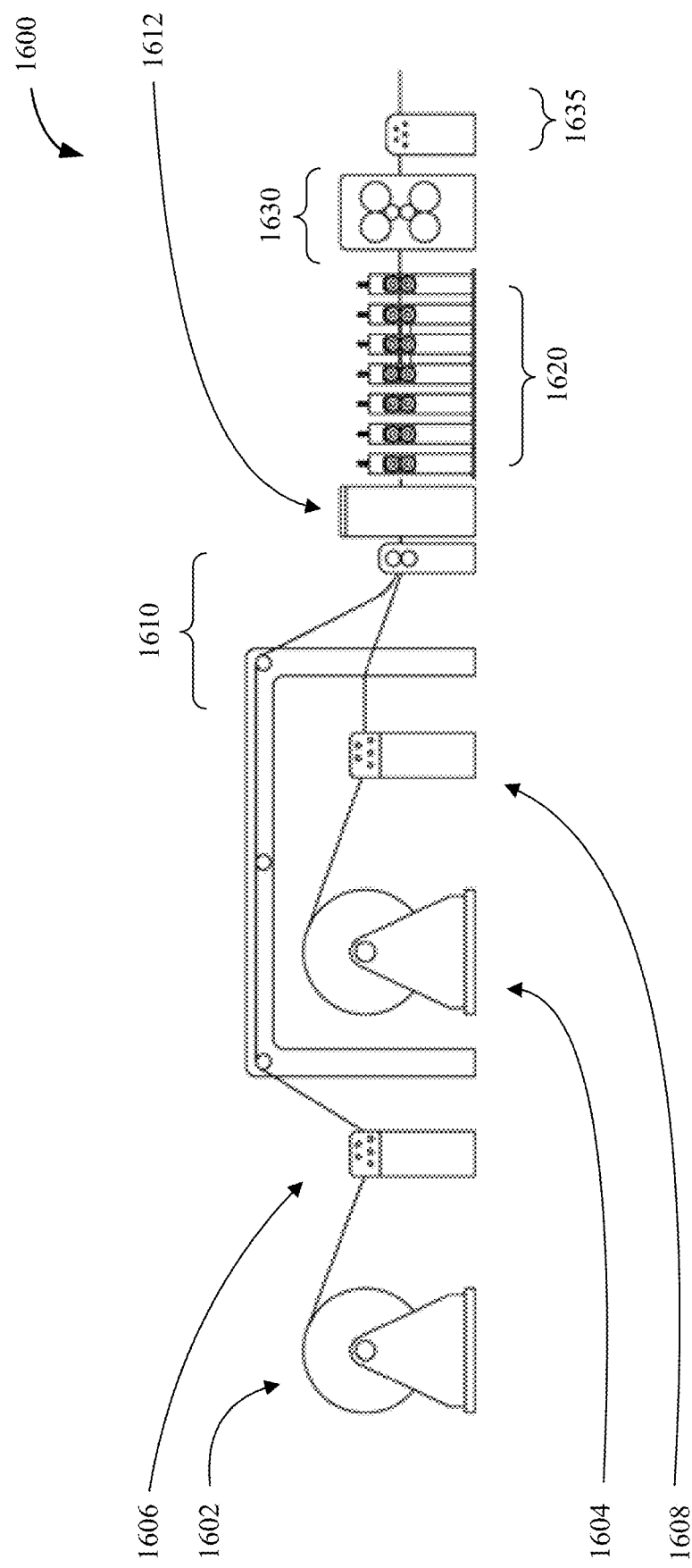
FIGS. 16A and 16B illustrate a side elevation view and a perspective view, respectively, of a machine including a combination of stages for producing a combined sheet, in accordance with another example of the present application.
Figure 16B:
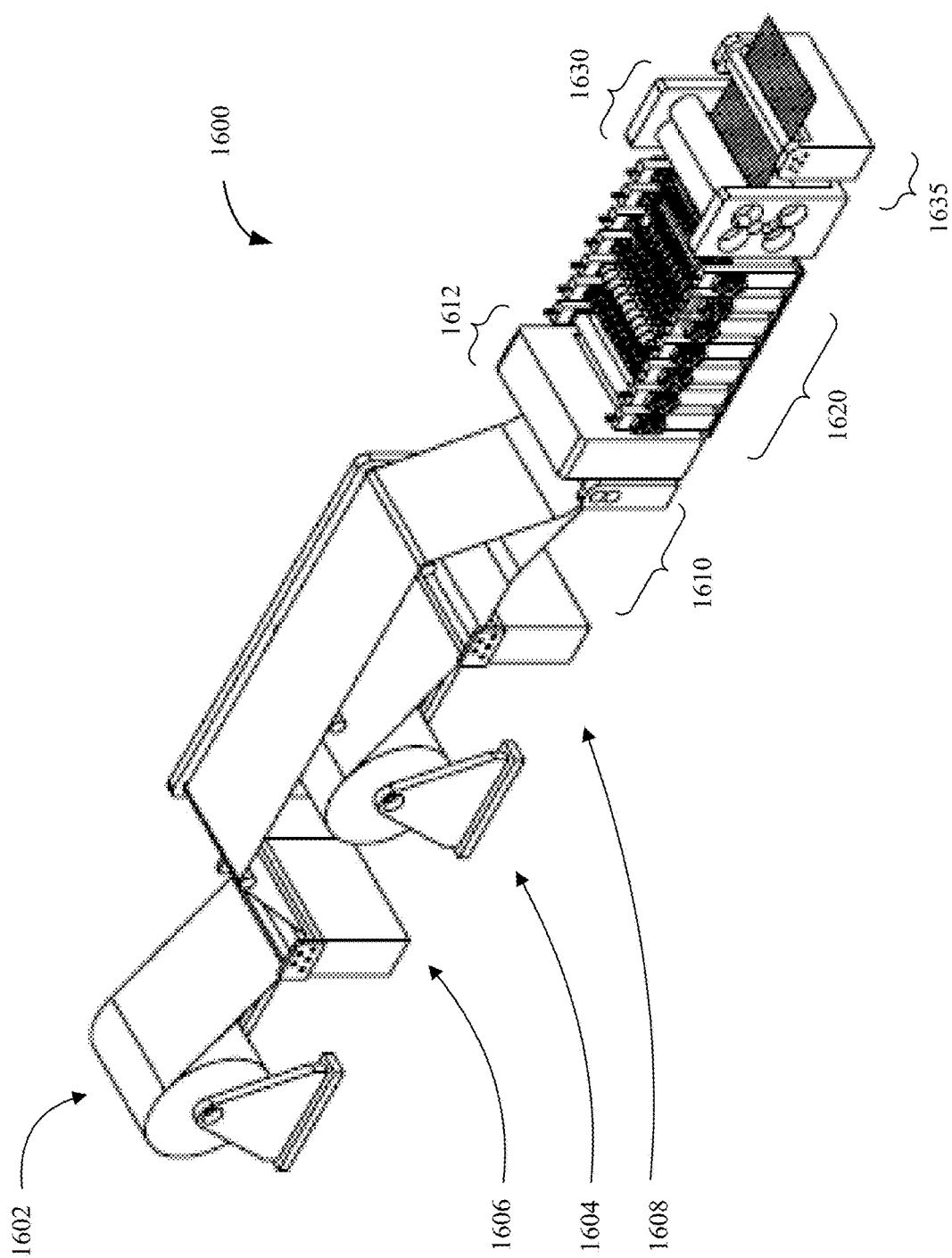

Reference is now made to FIGS. 16A and 16B, which illustrate a machine 1600 including a combination of stages for producing a combined sheet including a main sheet and a foundation sheet, in accordance with an example of the present application. FIG. 16A illustrates a side elevation view of the machine depicting example stages of the machine for producing a combined sheet. FIG. 16B illustrates a perspective view of the machine illustrated in FIG. 16A.

The machine 1600 includes a first coil opener 1602, a second coil opener 1604, a first leveler 1606, a second leveler 1608, a feeding system 1610, a heater 1612, an indentation roll former 1620, a mill roll former 1630, and a combined sheet leveler 1635. The first coil opener 1602, the second coil opener 1604, the first leveler 1606, the second leveler 1608, the feeding system 1610, the heater 1612, the mill roll former 1630, and the combined sheet leveler 1635 may be similar to the first coil opener 1502, the second coil opener 1504, the first leveler 1506, the second leveler 1608, the feeding system 1510, the heater 1512, the mill roll former 1530, and the combined sheet leveler 1535 illustrated in FIGS. 15A and 15B.

The indentation roll former 1620 may be configured to form indentation features at two or more locations across the combination of the foundation sheet and the main sheet. That is, the indentation roll former 1620 may include a roller configured with a plurality of punches. The roller may be configured to press the plurality of punches onto the sheet combination (e.g., the foundation sheet and the main sheet) being conveyed along the production line.

As described, in some examples, the double action press 1520 of FIGS. 15A and 15B may include punches on both a top plate and a bottom plate such that a subset of indentation features formed in sheet materials may protrude from a top portion of the combined sheet and another subset of indentation features formed in the sheet material may protrude from a bottom portion of the combined sheet. In some examples, the double action press 1520 may be configured to translate a force in a direction that is normal or perpendicular to a surface of the sheet combination (e.g., the foundation sheet and the main sheet) into a force in a direction for an indentation feature. To illustrate, reference is now made to FIG. 17, which illustrates a free-body diagram illustrating force directions being applied by the example double action press 1520 of FIGS. 15A and 15B.

The double action press 1520 of FIGS. 15A and 15B may include a top plate and a bottom plate. The top plate may be configured to impart a first normal force 1702 that is perpendicular to a sheet combination surface 1750. The bottom plate may be configured to impart a second normal force 1704 that is also perpendicular to the sheet combination surface 1750. The first normal force 1702 and the second normal force 1704 may be applied from opposing sides of the sheet combination surface 1750.

Further, the double action press 1520 may be configured to translate the first normal force 1702 and the second normal force 1704 into a force having a direction corresponding to a direction of one or more respective indentation features. For example, the double-action press 1520 may be configured to translate the first normal force 1702 into a third force 1710 having a third direction (illustrated in FIG. 17). The double-action press 1520 may also be configured to translate the first normal force 1702 into a fourth force 1712 having a fourth direction (illustrated in FIG. 17).

Figure 17:
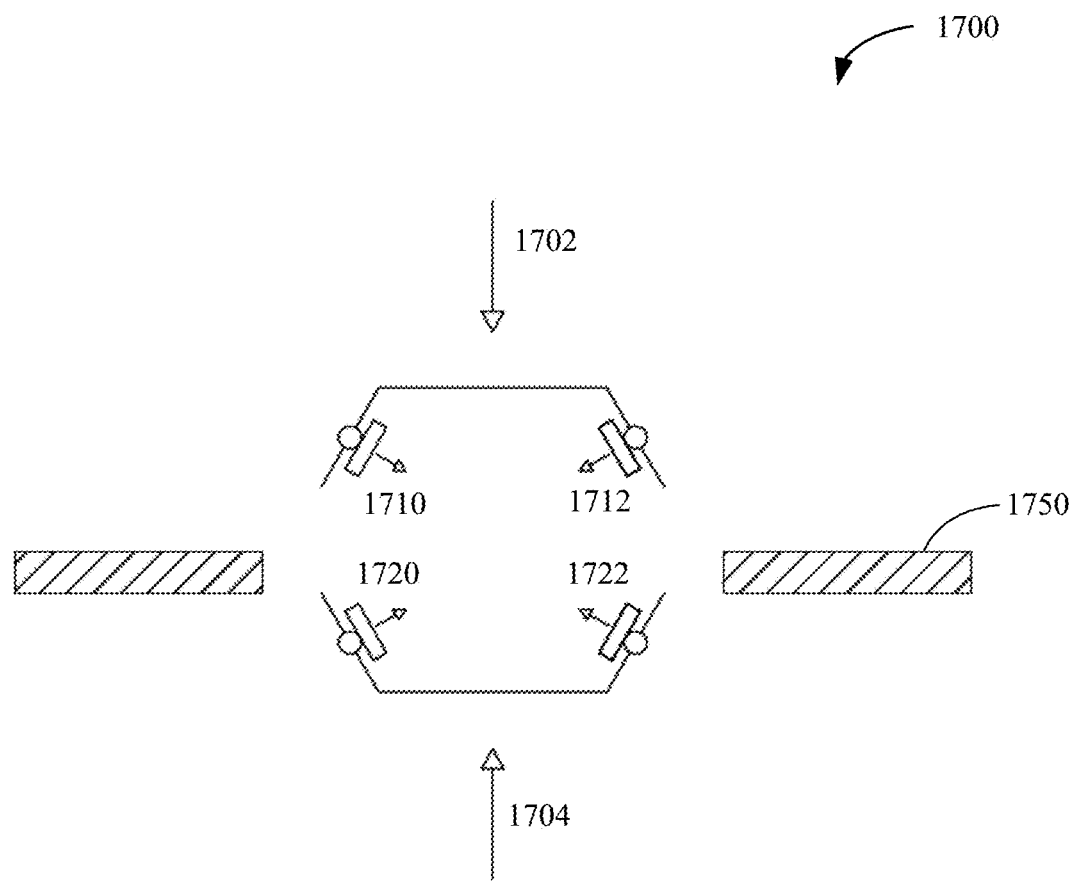
FIG. 17 illustrates a free-body diagram illustrating force directions applied by a double action press, in accordance with an example of the present application.

Further, the double-action press 1520 may be configured to translate the second normal force 1704 into a fifth force 1720 having a fifth direction (illustrated in FIG. 17). The double action press 1520 may also be configured to translate the second normal force 1704 into a sixth force 1722 having a sixth direction (illustrated in FIG. 17).

To illustrate a double action press apparatus configured to impart forces in the various directions that are illustrated in FIG. 17, reference is now made to FIGS. 18A and 18B, which illustrate a press apparatus including one or more indentation punches for forming indentation features in sheet material, in accordance with another example of the present application. The press apparatus 1800 in FIG. 18A is illustrated at a first stage and the press apparatus 1800 in FIG. 18B is illustrated at a second stage. The press apparatus 1800 at the second stage is in response to the first normal force 1702 and the second normal force 1704 being applied.

The press apparatus 1800 may operate when the first normal force 1702 (FIG. 17) and the second normal force 1704 (FIG. 17) is applied to a ram press 1820. The ram press 1820 may include a pair of components including a top portion and a bottom portion associated with a top ram press and a bottom ram press. In some examples, the first normal force 1702 may be applied at substantially the same time as the second normal force 1704. In some other examples, the first normal force 1702 may be applied at a time that is offset from the second normal force 1704.

When at least one of the first normal force 1702 and the second normal force 1704 is applied to the ram press 1820, at least one of the third force 1710, the fourth force 1712, the fifth force 1720, or the sixth force 1722 may be applied to one or more indentation punches 1830. When at least one of the aforementioned forces may be applied to the one or more indentation punches 1830, the indentation punches 1830 may be thrust towards the sheet receiving space 1802. The sheet receiving space 1802 can be described as a material receiving slot. The sheet receiving space 1802 may be configured to receive combination sheet material, including a foundation sheet that may abut a main sheet for producing a combined sheet. The respective indentation punches 1830 may be thrust towards the sheet receiving space 1802 for producing indentation features described herein. The respective indentation punches 1830 may be thrust towards the sheet receiving space 1802 in a direction corresponding to an indentation direction of respective indentation features.

For example, referring again to FIG. 7A, the first indentation feature 790 (FIG. 7A) may be formed using one of the indentation punches 1830, and the indentation punch 1830 may be thrust towards the sheet receiving space 1802 in the first indentation direction including a combination of the positive x-direction and positive z-direction (see e.g., FIG. 7A).

Further, the respective indentation punches 1830 may be thrust towards the sheet receiving slot 1802 with guidance of respective guides 1810. That is, the respective guides 1810 may allow the indentation punches 1830 to be thrust towards the sheet receiving space 1802 at specified or preconfigured directions.

In some examples, the press apparatus 1800 may also include a roller interface 1812. The roller interface 1812 may couple the ram press to respective indentation punches 1830 for thrusting the respective indentation punches 1830 towards the sheet receiving space 1802.

The press apparatus 1800 may be operated in a first state (FIG. 18A) and a second state (FIG. 18B). In the first state (FIG. 18A), the indentation punches 1830 may be in a retracted configuration and the sheet receiving space 1802 may be available for receiving sheet materials. Once sheet materials are received in the sheet receiving space 1802, the first normal force 1702 (FIG. 17) and the second normal force 1704 (FIG. 17) may be imparted on the ram press 1820 and the press apparatus 1800 will be transitioned to the second state (FIG. 18B). In the second state, the indentation punches 1830 may be thrust towards the sheet receiving space 1802 for forming indentation features in the combination of the main sheet and the foundation sheet. In some examples, the first normal force 1702 and the second normal force 1704 may be applied to the ram press 1820 at preconfigured periodic intervals, such that the main sheet and the foundation sheet being propagated along the machine (see e.g., FIGS. 15A, 15B, 16A, 16B) may be provided with indentation features when the sheet materials are propagated through the sheet receiving space 1802. It can be appreciated that, in some examples, the press apparatus 1800 illustrated in FIGS. 18A and 18B may be used for producing the combined sheet illustrated in FIG. 7A.

Figure 19C:
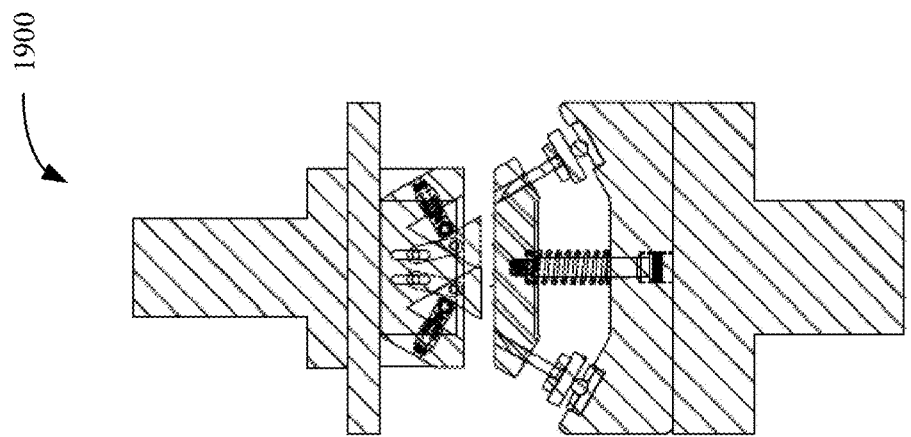
FIGS. 19A to 19C illustrate elevation, cross-sectional views of a press apparatus at varying operational stages for forming indentation features, in accordance with another example of the present application.
Figure 19B:
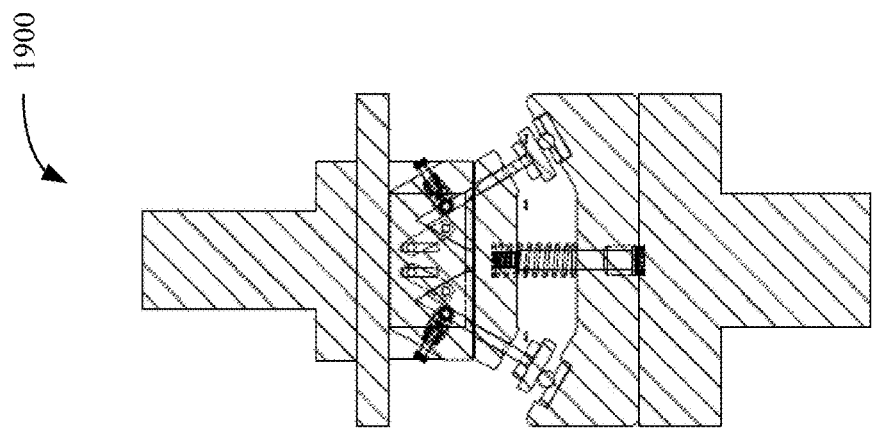
Figure 19A:
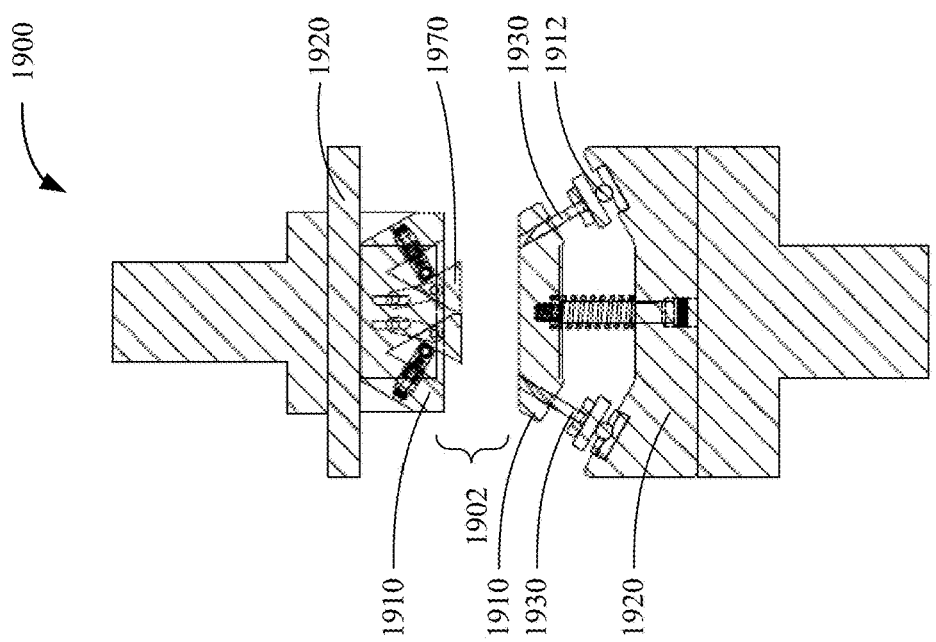

Reference is now made to FIGS. 19A, 19B, and 19C, which illustrate a press apparatus 1900 including one or more indentation punches for forming indentation features in sheet material, in accordance with another example of the present application.

The press apparatus 1900 may operate when the first normal force 1702 (FIG. 17) and the second normal force 1704 (FIG. 17) is applied to a ram press 1920. In some examples, the ram press 1920 may include a top portion and a bottom portion, where the first normal force 1702 may be applied to the top portion and the second normal force 1704 may be applied to the bottom portion. In some examples, the first normal force 1702 may be applied at substantially the same time as the second normal force 1704. In some other examples, the first normal force 1702 may be applied at a time that is offset from the second normal force 1704.

When the second normal force 1704 is applied to the ram press 1920, at least the fifth force 1720 or the sixth force 1722 may be applied to indentation punches 1930. When at least one of the aforementioned forces may be applied to the one or more indentation punches 1930, the indentation punches 1930 may be thrust towards a sheet receiving space 1902. The sheet receiving space 1902 may be configured to receive combination sheet material, including a foundation sheet that may abut a main sheet for producing a combined sheet. The respective indentation punches 1930 may be thrust towards the sheet receiving space 1902 in a direction corresponding to an indentation direction of respective indentation features.

Further, the respective indentation punches 1930 may be thrust towards the sheet receiving space 1902 with guidance of guides 1910. That is, the guides 1910 may allow the indentation punches 1930 to be thrust towards the sheet receiving space 1902 at specified or preconfigured directions.

In some examples, the press apparatus 1900 may also include a roller interface 1912. The roller interface 1912 may couple the ram press to indentation punches 1930 for thrusting the respective indentation punches 1930 towards the sheet receiving space 1902.

The press apparatus 1900 may be configured to form indentation features (described herein) on a combination of a foundation sheet and a main sheet, such that the indentation features may protrude from a common side of the produced combined sheet. For example, the press apparatus 1900 may include indentation punches 1930 adjacent to a ram press 1920, such that indentation punches 1930 may be thrust into the sheet receiving space 1902 from a single side.

In some examples, the press apparatus 1900 may include one or more sheet retention blocks 1970. When the first normal force 1702 (FIG. 17) may be applied to the ram press 1920, the press apparatus 1900 may be configured to thrust the sheet retention blocks 1970 towards the sheet receiving space 1902. When the sheet retention blocks 1970 are thrust towards the sheet receiving space 1902, the sheet material received in the sheet receiving space 1902 may be held in place, in part, by the sheet retention blocks 1970, such that the indentation punches 1930 may form indentation features in the sheet materials. To illustrate, FIG. 19A illustrates a first state, where the first normal force 1702 (FIG. 17) and the second normal force 1704 (FIG. 17) has not yet been applied to the ram press 1920.

FIG. 19B illustrates a second state, where the first normal force 1702 (FIG. 17) and the second normal force 1704 (FIG. 17 may be applied to the ram press 1920 and the sheet retention blocks 1970 may be urged against at least one of the guides 1910.

FIG. 19C illustrates a third state, where the first normal force 1702 and the second normal force 1704 may be released subsequent to the indentation punches 1930 being thrust towards the sheet receiving space 1902 for forming the indentation features. Once the indentation punches 1930 have been thrust towards the sheet receiving space 1902 for forming the indentation features, the foundation sheet is joined to the main sheet for forming the combined sheet portion. That combined sheet portion forms a portion of the combined sheet being formed and conveyed along the machine (see e.g., FIGS. 15A, 15B, 16A, 16B).

From the examples described herein, a combined sheet may include two or more indentation features. A first indentation feature may include a first main indentation feature providing a first overhang over a first portion of the main sheet. A first foundation indentation feature may be crimped to the first main indentation feature. A second indentation feature may include a second main indentation feature providing a second overhang over a second portion of the main sheet. The second indentation feature may include a second foundation indentation feature crimped to the second main indentation feature. The first overhang and the second overhang may be overhangs in different directions to prohibit separation of the foundation sheet from the main sheet.

The two or more indentation features may be formed for joining the foundation sheet to the main sheet. Thus, the foundation sheet may be joined to the main sheet based at least on: (1) plastic flow occurring during joint creation at respective indentation features; and/or (2) binding forces due in part to the spatial orientation/direction the first indentation feature relative to the second indentation feature. Because the first indentation feature and the second indentation feature may include features formed from sheet metal material having some rigid properties, separating the foundation sheet from the main sheet may not occur unless the general shape of the respective indentation features is deformed. Based at least in part on the rigid material properties of the first indentation feature and the second indentation feature and on the respective indentation features providing overhangs that may be oriented in different directions, the main sheet and the foundation sheet may be formed without the use of adhesives or other materials providing bonds between materials.

Certain adaptations and modifications of the described embodiments can be made. Therefore, the above discussed embodiments are considered to be illustrative and not restrictive.

What is claimed is:

1. A combined sheet comprising: a main sheet including a first main indentation feature providing a first overhang over a first portion of the main sheet and a second main indentation feature providing a second overhang over a second portion of the main sheet; and a foundation sheet abutting the main sheet, the foundation sheet including a first foundation indentation feature and a second foundation indentation feature, the first foundation indentation feature being crimped to the first main indentation feature and the second foundation indentation feature being crimped to the second main indentation feature, wherein the first main indentation feature and the second main indentation feature protrude to form respective overhang cavities for crimping the first foundation indentation feature within the first main indentation feature and for crimping the second foundation indentation feature within the second main indentation feature respectively, wherein the respective overhang cavities include a first overhang cavity having a first cavity opening and a second overhang cavity having a second cavity opening, and wherein the first cavity opening is adjacent to the second cavity opening, wherein the first overhang and the second overhang provide overhangs in different directions to prohibit separation of the foundation sheet from the main sheet, wherein the different directions include a first direction and a second direction, wherein the first direction and the second direction are each a three-dimensional direction and wherein the first overhang is associated with the first direction defined by a first angle between: (a) the first portion of the main sheet; and (b) an indentation surface of the first overhang that hovers over the first portion of the main sheet, and wherein the second overhang is associated with the second direction defined by a second angle between: (a) the second portion of the main sheet; and (b) an indentation surface of the second overhang that hovers over the second portion of the main sheet, and wherein the first direction and the second direction are in substantially opposite directions, and wherein the main sheet and the foundation sheet are sheet metal sheets.

2. The combined sheet of claim 1, wherein the first foundation indentation feature extends within the first overhang and the second foundation indentation feature extends within the second overhang.

3. The combined sheet of claim 1, wherein the first angle or the second angle is an acute angle.

4. The combined sheet of claim 1, wherein the first main indentation feature and the second main indentation feature are oriented on the main sheet to have rotational symmetry about an indentation rotation point, the indentation rotation point being equidistant to a centroid of the first portion of the main sheet and a centroid of the second portion of the main sheet.

5. The combined sheet of claim 1, further comprising at least one additional sheet abutting the foundation sheet, the at least one additional sheet including a first additional indentation feature crimped to the first foundation indentation feature and a second additional indentation feature crimped to the second foundation indentation feature for joining the additional sheet to the foundation sheet and the main sheet.

6. The combined sheet of claim 1, wherein the main sheet and the foundation sheet are composed of different materials.

7. The combined sheet of claim 1, wherein at least one of the main sheet or the foundation sheet is a perforated sheet.

8. The combined sheet of claim 7, wherein the combination of a non-perforated main sheet and a perforated foundation sheet includes a plurality of divots corresponding to perforations in the perforated foundation sheet, and wherein the combined sheet further comprises a non-metal material being placed within one or more of the divots.

9. The combined sheet of claim 1, further comprising a non-metal material being placed within an overhang cavity formed by one of the first foundation indentation feature or the second foundation indentation feature of the foundation sheet, wherein the non-metal material is at least one of epoxy, mineral wool, tar, paper clay, or polystyrene foam.

10. The combined sheet of claim 1, wherein the first overhang extends above the main sheet and the foundation sheet and wherein the second overhang extends below the main sheet and the foundation sheet.

11. The combined sheet of claim 1, wherein the first overhang and the second overhang are punch formed using a first indentation punch and a second indentation punch, the first indentation punch and the second indentation punch acting in generally opposing directions and on opposing surfaces.

* * * * *